(12) United States Patent
Ohashi et al.

(10) Patent No.: US 6,240,126 B1
(45) Date of Patent: May 29, 2001

(54) WIRELESS COMMUNICATION DEVICE

(75) Inventors: Tsuyoshi Ohashi, Hashima; Hironobu Wakayama, Nagoya, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 08/932,177

(22) Filed: Sep. 17, 1997

(30) Foreign Application Priority Data

Sep. 18, 1996 (JP) .................................................. 8-269292
Oct. 23, 1996 (JP) .................................................. 8-280531

(51) Int. Cl.[7] .................................................. H04L 27/30
(52) U.S. Cl. .................. 375/132; 375/130; 375/131; 375/133; 375/137
(58) Field of Search .................. 370/343, 344, 370/480; 375/130, 132, 131, 133, 137

(56) References Cited

U.S. PATENT DOCUMENTS

| 4,716,573 | * | 12/1987 | Bergstrom et al. | 375/202 |
| 4,850,036 | * | 7/1989 | Smith | 455/502 |
| 5,214,788 | * | 5/1993 | Delaperriere et al. | 455/32.1 |
| 5,323,447 | * | 6/1994 | Gillis et al. | 455/464 |
| 5,506,863 | * | 4/1996 | Meidan et al. | 375/202 |
| 5,541,954 | * | 7/1996 | Emi | 375/202 |
| 5,870,391 | * | 2/1999 | Nago | 370/330 |
| 5,907,545 | * | 5/1999 | Arai et al. | 370/342 |

FOREIGN PATENT DOCUMENTS 6-334630   12/1994   (JP) .
7-107010    4/1995   (JP) .

* cited by examiner

*Primary Examiner*—Stephen Chin
*Assistant Examiner*—Shuwang Liu
(74) *Attorney, Agent, or Firm*—Oliff & Berridge, PLC.

(57) ABSTRACT

Test hopping frequency data stored in the hopping frequency data table 35b is set in the hopping table 26 as a data setting signal w. Digital test data is transmitted while hopping the carrier wave frequency among the frequency candidates which correspond to the hopping frequency data thus set in the hopping table 26. Frequency candidates which have attained high recognition rate for the test data are selected as a carrier wave hopping pattern, and are set in the hopping table 26. Bi-directional communication will be performed thereafter while the carrier wave frequency hops according to the hopping pattern.

18 Claims, 12 Drawing Sheets

FIG. 2
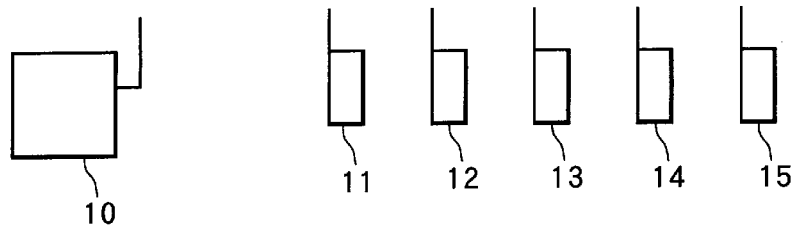
FIG. 3
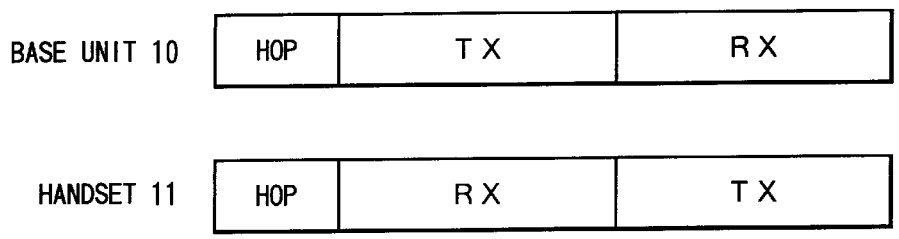
FIG. 4
| CHANNEL 35a | SPREAD CODE | ERROR RATE | TOTAL ERROR RATE 35b |
|---|---|---|---|
| c | f | e11~e15 | eT |
| 1 | f1 | e11(1)~e15(1) | eT(1) |
| 2 | f2 | e11(2)~e15(2) | eT(2) |
| 3 | f3 | e11(3)~e15(3) | eT(3) |
| 4 | f4 | e11(4)~e15(4) | eT(4) |
| ⋮ | ⋮ | ⋮ | ⋮ |
| L | fL | e11(L)~e15(L) | eT(L) |

FIG. 5

| ADDRESS | TEST DATA | | | | | | | | HORIZONTAL CHECK SUMS |
|---|---|---|---|---|---|---|---|---|---|
| CA00 | C3 | 35 | CF | C3 | 36 | CC | C3 | 54 | A3 |
| CA08 | CC | C3 | 54 | CA | C3 | 93 | CB | C3 | 91 |
| CA10 | 33 | CB | C3 | 19 | CB | C3 | 21 | CA | 53 |
| CA18 | C3 | 86 | CA | C3 | A4 | CA | C3 | F1 | F8 |
| CA20 | CA | 21 | (00) | 40 | (22) | A0 | C9 | 11 | (C7) |
| CA28 | 00 | 04 | 21 | 00 | E8 | 22 | A2 | C9 | 9A |
| CA30 | 19 | 22 | A4 | C9 | 19 | 22 | A6 | C9 | 52 |
| CA38 | 19 | 22 | A8 | C9 | 3E | 04 | 32 | DF | FF |
| CA40 | C9 | 3E | 01 | 21 | EC | C9 | 0E | 09 | F5 |
| CA48 | 77 | 0D | 23 | 20 | FB | 2A | A0 | C9 | 55 |
| CA50 | 22 | 00 | FB | C9 | D3 | E1 | 21 | 00 | 88 |
| CA58 | 00 | 22 | (00) | E0 | (21) | 00 | E0 | CD | (D0) |
| CA60 | 7E | CA | 3E | 00 | D3 | EA | 21 | 00 | 64 |
| CA68 | E0 | 22 | AA | C9 | DD | 2A | AA | C9 | EF |
| CA70 | DD | 6E | 00 | DD | 66 | 01 | 23 | DD | 8F |
| CA78 | 75 | 02 | DD | 74 | 03 | C9 | 7E | 23 | 35 |
| VERTICAL CHECK SUMS | 93 | 7B | (EE) | 3F | (BD) | B6 | D0 | BC | (1A) |

FIG. 7 (a)

| SPREAD CODES f | ERROR RATE eT |
|---|---|
| f5 | eT5 |
| f8 | eT8 |
| f10 | eT10 |
| f11 | eT11 |
| f13 | eT13 |
| ⋮ | ↓ |
| ⋮ | ⋮ |
| f240 | eT240 |
| f243 | eT243 |

| SPREAD CODES f | ERROR RATE eT |
|---|---|
| f5 | eT5 |
| f8 | eT8 |
| f10 | eT10 |
| f11 | eT11 |
| f13 | eT13 |
| ⋮ | ⋮ |
| f125 | eT125 |

| CHANNEL c | SPREAD CODES f | ERROR RATE eT |
|---|---|---|
| 1 | f125 | eT125 |
| 2 | f10 | eT10 |
| 3 | f23 | eT23 |
| 4 | f5 | eT5 |
| 5 | f80 | eT80 |
| ⋮ | ⋮ | ⋮ |
| K | f11 | eT11 |

WIRELESS COMMUNICATION DEVICE

BACKGROUND OF THE INVENTION

1. Field of the Invention

The present invention relates to a wireless communication device for performing bi-directional communication with a remote communication device while repeatedly hopping a carrier wave frequency at a predetermined hopping pattern.

2. Description of Related Art

Recently, there has been proposed a wireless communication device of a spread spectrum type. In order to transmit data to a remote communication device, the communication device modulates data into a modulation signal and transmits the modulation signal with a carrier wave whose frequency is widely spread. Upon receipt of the signal, the remote communication device despreads the frequency of the carrier wave to obtain the modulation signal, demodulates the signal into the original data. According to this spread spectrum method, it is possible to perform bi-directional communication with a plurality of frequencies with low power density.

A frequency hopping method is one of the spread spectrum method. According to the frequency hopping method, when transmitting data, the data is first modulated into a modulation signal. The frequency of the modulation signal is then spread into a wider range through repeatedly multiplying the modulation signal with a signal with a repeatedly-hopping frequency. The thus frequency-spread signals are transmitted to the remote communication device. In other words, the modulation signals are transmitted with a frequency-hopping carrier wave. Upon receipt of the modulation signals, the remote communication device first despreads the frequency of the received signals into the original frequency through multiplying the received signal with the signal of the repeatedly-hopping frequency. Then, the frequency-despread signals are demodulated into the original data.

According to the frequency hopping method, it is possible to reliably protect the privacy. It is also possible to decrease the possibility that a communication trouble will occur due to interference with other electric signals. The frequency hopping method is therefore being widely used in telephones, facsimile machines, and the like.

The wireless communication device, for performing the frequency hopping communication, is conventionally provided with a hopping pattern table. The hopping pattern table stores therein a predetermined number of sets of predetermined hopping frequency data which are indicative of the predetermined number of frequencies to be hopped. The communication device therefore performs communication with a carrier wave whose frequency is hopped according to the hopping pattern stored in the hopping table.

There is a possibility, however, that a communication device operating in a reception mode is located near some electric sources which are outputting electric signals with high power. In this case, interference occurs between the electric signals (communication disturbing signals) and the frequency-hopping carrier wave signals at some frequencies. The communication device may not properly demodulate the received signals into the original data. In other words, communication trouble occurs due to the interference between the frequency-hopping carrier wave signals and the communication disturbing signals. Reliability in the communication is deteriorated.

Japanese Patent Application Publication (Laid-Open) No. 6-334630 provides a method for previously measuring the received level of the communication disturbing signals at a plurality of different frequencies. The predetermined number of frequencies are then selected based on the measured levels. That is, a frequency, that provided the smallest level, is selected first. Then, another frequency, that provided the second smallest level, is selected second. Thus, the predetermined number of frequencies are successively selected in the order of their measured levels. Thus, a hopping patter table, storing the predetermined number of frequencies, is created. The thus created hopping pattern table is provided to each of all the communication devices in the same communication group. Accordingly, communication will be performed only with those hopping carrier waves whose frequencies are confirmed to develop low degree of interference with communication disturbing signals. The reliability in communication is therefore greatly enchanced.

Japanese Patent Application Publication No.7-107010 provides another method for enabling communication with only those carrier waves that do not suffer from any communication troubles. According to this method, the communication device continuously monitors a reception state of signals transmitted from a remote communication device. When detecting that the reception state is deteriorated or that an error rate is high at a certain frequency due to interference with communication disturbing signals, the communication device deletes the corresponding frequency data from the predetermined hopping pattern table. The communication device also adds the hopping pattern table with new frequency data which is not yet used and which is confirmed not to interfere with any communication disturbing signals. Thus, when communication starts, the hopping pattern is successively changed at the communication device of the receiving side. At each communication blank time for hopping frequency from one to another, information on the changed hopping pattern is transmitted from the communication device at the reception mode to the remote communication device at the transmission mode.

SUMMARY OF THE INVENTION

According to the method proposed by the publication No. 6-334630, reliability in each carrier wave frequency communication is judged based on the level, i.e., the strength of the received communication disturbing waves. Because the carrier waves for the subject communication and the communication disturbing waves are originated from different analog wave sources, the communication disturbing wave level will greatly vary relative to the level of the carrier wave to be received. It is difficult to accurately judge the reliability in communication.

There is a possibility that the level of the carrier wave, received at the communication device, becomes low due to several causes, such as the power of the communication device, a place where the communication device is located, and some wave troubles. In this case, even when the communication disturbing wave level is low, the relative value of the communication disturbing wave level becomes high with respect to the level of the received carrier wave. Accordingly, the reliability is greatly deteriorated.

Contrarily, when the level of the received carrier wave is high, even when the communication disturbing wave level is high, the relative value of the disturbing wave level becomes small with respect to the carrier wave level. communication can therefore be attained with high reliability.

Thus, the judgment is affected by the level of the received carrier wave. In order to attain an accurate judgment, therefor, it is necessary to maintain fixed the relationship between the communication disturbing wave level and the carrier wave level. The communication device has to be provided with an additional circuit structure for maintaining fixed the relationship between the communication disturbing wave level and the carrier wave level. In this case, the entire circuit structure of the communication device will become complicated. Or, the communication device has to be used according to a predetermined condition so as to receive a predetermined fixed amount of carrier wave.

According to the other method proposed by the publication No. 7-107010, it takes a certain amount of time to finally produce a suitable hopping pattern. At every communication start timing, communication is performed with a hopping pattern which is originally stored in the device. Then, as communication is performed while repeatedly hopping carrier wave frequencies, the original hopping pattern is changed. Accordingly, after a certain amount of time passes, the original hopping pattern is properly changed into a suitable hopping pattern. During this time period until the hopping pattern is completely changed, the communication is performed with those frequencies that induce interference with external disturbing signals. Communication is therefore performed at a high error rate during the initial stage of every communication operation.

When the communication device is turned off, and then the communication device is turned on again, the communication is started with the original hopping pattern. The hopping pattern changing operation has to be performed again. Accordingly, every time the communication is started, communication with a high error rate is performed at its initial stage.

Additionally, every time the communication device is moved from one location to another, the frequency hopping pattern has to be changed. This is because communication circumstances, such as eternal noises and carrier wave reception levels, largely vary according to the locational site of the communication device. Communication circumstances also vary as time passes. Accordingly, the proper hopping pattern should be determined according to various aspects.

The present invention is therefore to provide a frequency hopping communication device which has a simple circuit structure and which can be used in an unlimited condition, but which is capable of performing, at any time, i.e., even immediately after communication is started, high quality communication with using carrier waves whose frequencies are confirmed with high accuracy as provides desirable communication.

In order to attain the above and other objects, the present invention provides a wireless communication device, comprising: means for performing bi-directional test communication with digital test data with carrier wave frequency hopping according to a predetermined plurality of frequency candidates; means for selecting, from the plurality of frequency candidates, several frequency candidates which have attained a high recognition rate for the digital test data; means for setting a hopping pattern based on the selected several frequency candidates; and means for performing bi-directional communication with desired data with carrier wave frequency hopping according to the hopping pattern. The selecting means may preferably include: means for calculating an error rate of the received test data at each of the plurality of frequency candidates; and error rate-dependent selection means for selecting several frequency candidates dependent on the calculated error rates. The error rate-dependent selection means may include: means for rearranging data of the plurality of frequency candidates in an order of the magnitude of their error rates, the plurality of frequency candidates including a total L number of frequency candidates where L is an integer high than one; and means for selecting, from the thus rearranged L number of frequency candidates, K number of frequency candidates from a first candidate that has the minimum error rate and that is located first among the L number of candidates toward a K-th candidate that has the K-th minimum error rate and that is located K-th among the plurality of frequency candidates where K is an integer higher than one and lower the L.

The error rate-dependent selection means may include means for selecting several frequency candidates whose error rates are smaller than a predetermined threshold. In this case, the wireless communication device may further comprise means for correcting errors in received data, the predetermined threshold being set smaller than a limit error rate of errors uncorrectable by the error correction means by a predetermined amount.

According to another aspect, the present invention provides a wireless communication device, comprising: means for storing data indicative of a condition for selecting frequencies; means for performing communication with a carrier wave while successively selecting frequencies of the carrier wave according to the condition, data indicative of which is being stored in the storing means; means for measuring a reception state of communication at each of the successively-selected frequencies; and means for changing the data indicative of the condition stored in the storing means according to the measured reception state. The storing means may maintain the data indicative of the condition both during the communication means performs communication and during the communication means stops performing communication. The data indicative of the condition may be constructed from data of the reception state measure by the measuring means for each frequency.

The storing means may include: an initial state memory storing data of a predetermined initial condition for selecting frequencies; and an operational state memory storing data of the changed condition for selecting frequencies. The communication means may include means for selecting either one of the initial condition stored in the initial state memory and the changed condition stored in the operational state memory to select frequencies at the initial stage of each communication.

BRIEF DESCRIPTION OF THE DRAWINGS

The above and other objects, features and advantages of the invention will become more apparent from reading the following description of the preferred embodiment taken in connection with the accompanying drawings in which:

FIG. 2 illustrates the base unit and the five wireless handsets;

FIG. 3 illustrates how communication is attained according to a TDD method;

FIG. 4 shows a hopping frequency data table 35a and an error rate table 35b;

FIG. 5 shows test data and check sum data;

FIGS. 7(a)–7(c) shows the process of selecting hopping frequency data, in which FIG. 7(a) shows how to rearrange the L number of error rates in the order of their amounts or magnitudes; FIG. 7(b) shows how to select the K number of error rates; and FIG. 7(c) shows how to randomly rearranging the selected K number of error rates;

FIG. 10(a) illustrates how a hopping pattern table 110a stores therein a plurality of frequency hopping data;

FIG. 10(b) illustrates how a operational state memory 110b stores therein a plurality of flags indicative of reception states of the plurality of frequency hopping data;

DETAILED DESCRIPTION OF THE PREFERRED EMBODIMENTS

Figure 1:
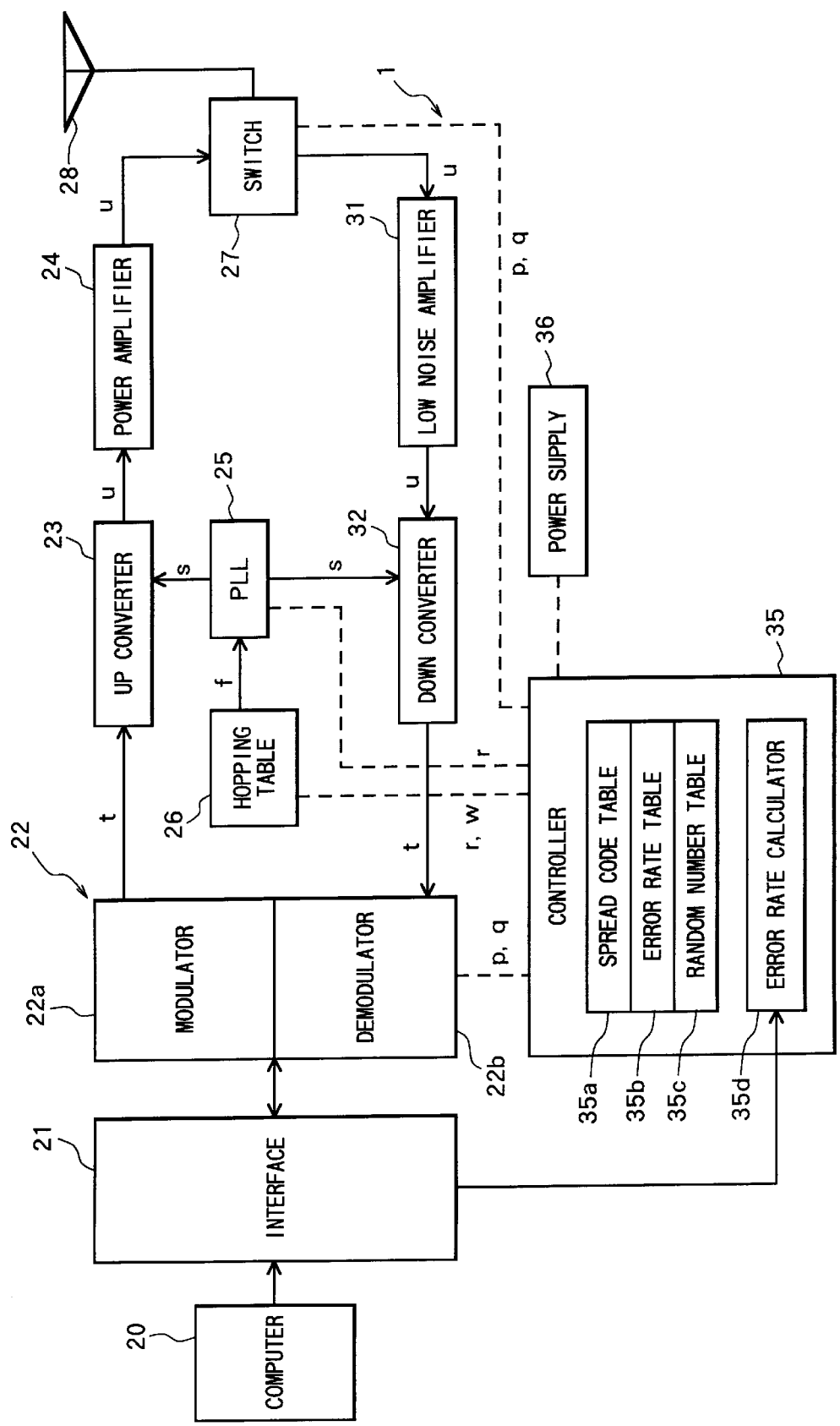
FIG. 1 is a block diagram of a wireless communication portion in each of a unit and wireless handsets according to a first embodiment.

A wireless communication device according to preferred embodiments of the present invention will be described while referring to the accompanying drawings wherein like parts and components are designated by the same reference numerals.

A first embodiment will be described below with to FIGS. 1 through 7(c).

A wireless communication device according to the first embodiment is used in a wireless communication system, in which frequency-hopping bi-directional communication is attained between a plurality of communication devices while a carrier wave frequency is repeatedly switched.

In this example, as shown in FIG. 2, the communication system is comprised from one base unit 1 and five wireless handsets 11–15. As will be described later, the base unit 1 is connected to an external circuit including a personal computer 20. The handsets 11–15 can communicate with the base unit 1 and can communicate with one another. Each of the base unit 1 and the handsets 11–15 is constructed from a telephone, a facsimile machine, a printer, a computer, or the like.

As shown in FIG. 3, communication between two of the base unit 1 and the handsets 11–15 is attained according to a TDD (Time Division Duplex) method. That is, when one of the two communication devices is in a transmission condition (TX), the other machine is in a reception condition (RX). The transmission and reception conditions TX and RX are alternately allocated to the two machines. It is noted that the communication can be attained according to TDMA (Time Division Multiple Access) method.

Each of the base unite 1 and the handsets 11–15 has a structure shown in FIG. 1. Each communication device has a wireless communication portion 1 for performing transmission and reception of data according to the frequency-hopping spread spectrum method.

The wireless communication portion 1 includes an interface 21 for interfacing with the external circuit such as the personal computer 20; a modem 22 connected to the interface 21 for transferring data to and for receiving data from the interface 21; a hopping table 26 for storing hopping frequency data f and for outputting the hopping frequency data f; a phase-locked loop (PLL) oscillator 25 connected to the hopping table 26 for oscillating a hopping frequency signal s with a frequency (frequency slot) corresponding to the supplied hopping frequency data f; and up converter 23 connected both to the modem 22 and to the PLL circuit 25 for multiplying a data modulation signal t supplied from the modem 22 and the hopping frequency signal s, thereby creating a frequency-spread modulation signal u with its carrier wave having a spread frequency; a power amplifier 24 connected to the up converter 23 for amplifying the frequency-spread signal u; a transmission/reception switch 27 connected to the power amplifier 24 for switching between a transmission mode and a reception mode; an antennae 28 connected to the transmission/reception switch 27 for transmitting the frequency-spread signal u and receiving another frequency-spread signal u transmitted from a remote communication device; a low noise amplifier 31 connected to the transmission/reception switch 27 for amplifying the received frequency-spread signal u; a down converter 32 connected to both the low noise amplifier 31 and the PLL circuit 25 for multiplying the frequency-spread signal u with the hopping frequency signal s, thereby creating a frequency-despread modulation signal t; a controller 35 for controlling the modem 22 and the switch 27 between the reception mode and the transmission mode through outputting transmission and reception instruction signals p and q, for setting the hopping pattern in the hopping table 26 through outputting a data setting instruction signal w, and for controlling hopping of the frequency hopping signal s through outputting hopping instruction signals r; and a power supply 36 for supplying power to the entire communication portion 1.

The interface 21 is connected to the external circuit including the personal computer 20. The personal computer 20 is for preparing test data and check sum data shown in FIG. 5 as will be described later. The interface 21 is for receiving, from the external circuit, transmission data to be transmitted, for processing the transmission data, and for outputting the transmission data to the modem 22. The interface 21 is also for receiving, from the modem 22, reception data received from a remote communication device, for processing the reception data, and for outputting the reception data to the external circuit 10. The interface 21 includes: a CODEC and a compressing circuit for performing conversion between sound data and digital data; and a data buffer and a data converter for performing error correction processes onto non-sound data. The interface 21 is also connected to the controller 35.

The modem 22 includes a modulator 22a for modulating data to be transmitted and a demodulator 22b for demodulating received data. The modem 22 switches the operational condition of the modulator 22a and the demodulator 22b during a transmission time and a reception tome according to a transmission instruction signal p and a reception instruction signal q which are issued from the controller 35. Upon receipt of a transmission instruction p, the modulator 22a is operated. Upon receipt of a reception instruction q, the demodulator 22b is operated.

The up converter 23 is provided with a mixer. The up converter 23 is connected to the phase-locked loop (PLL) oscillator 25, which is in turn connected to the hopping table 26. The hopping table 26 is for receiving a data setting signal w from the controller 35. The data setting signal w includes hopping frequency data indicative of a plurality of hopping frequency data f and channel data indicative of a plurality of channels. Upon receipt of the data setting signal w, the hopping table 26 stores the plurality of hopping frequency data (spread codes) f in correspondence with the plurality of channels.

The controller 35 supplies each of the hopping table 26 and the PLL oscillator 25 with a hoping signal r at a predetermined holding time interval. The hopping signal r indicates a channel setting value S. Every time the hopping table 26 receives the hopping signal r, the hopping table 26 outputs hopping frequency data f which is stores in correspondence with a channel C indicated by the channel setting value S. The hopping frequency data f is inputted to the PLL oscillator 25, which in turn produces a hopping frequency signal (oscillation signal) s with a frequency (f) corresponding to the hopping frequency data f. In this example, the PLL oscillator 25 outputs a hopping frequency signal with its frequency (fi) being determined according to a corresponding hopping frequency data fi where $1 \leq i \leq L$ (L is an integer higher than one (1)).

The up converter 23 receives the hopping frequency signal s supplied from the PLL oscillator 25. The up converter 23 also receives transmission data modulation signal t which has been modulated at and outputted from the modulator 22a. The up converter 23 multiplies the received signals s and t, producing a frequency-spread modulation signal u whose carrier wave has a spread or hopping frequency.

The power amplifier 24 is for amplifying the spread modulation signal u. The transmission/reception switch 27 is for receiving the transmission instruction signal p and the reception instruction signal q, which are issued from the controller 35. Upon receipt of the transmission instruction p, the transmission/reception switch 27 is brought into a transmission enable condition and transmits the spread modulation signal u to an antennae 28. Upon receipt of the reception instruction q, on the other hand, the transmission/reception switch 27 is brought into a reception enable condition and receives another spread modulation signal u which is transmitted from a remote communication device and which is received at the antennae 28. The switch 27 supplies the received signal u to the low noise amplifier 31.

The low noise amplifier 31 is for amplifying the received signal u before outputting the signal u to the down converter 32. The down converter 32 is for receiving also the hopping frequency signal s which is outputted form the PLL oscillator 25. Thus, the hopping frequency signal s is supplied from the PLL circuit 25 both to the up converter 23 and to the down converter 32. The down converter 32 is for despreading the frequency of the spread modulation signal u through multiplying the spread modulation signal u with the hopping frequency signal s, thereby producing the frequency-despread modulation signal t. The modulation signal t is supplied to the demodulation 22b. The demodulator 22b demodulates the modulation signal t and outputs the demodulated data to the interface 21.

With the above-described structure, the wireless communication portion 1 can be operated based on power supplied from the power supply 36. The power supply 36 is controlled by the controller 35 to selectively supply power to the entire portion 1 before a communication start time. That is, during a sleep mode time, the controller 35 controls the power supply 36 to supply power only to the controller 35. During a reception wait mode time, the controller 35 controls the power supply 36 to supply power to the entire portion 1 except for the up converter 23 and the power amplifier 24. During a communication mode time, the controller 35 controls the power supply 36 to supply power to the entire portion 1.

The controller 35 is provided with: a hopping frequency data table 35a, an error rate table 35b, a random number table 35c, and an error rate calculating portion 35d. As shown in FIG. 4, the hopping frequency data table 35a stores therein the total L number of sets of test hopping frequency data f1, f2, . . . , and fL where L is an integer higher that one (1). The test hopping frequency data (spread codes) f1, f2, . . . , and fL will be used as indicative of hopping frequency candidates (f1), (f2), . . . , (fL) during a test for searching carrier wave frequencies capable of providing highly reliable communication. During the test, each of all the hopping frequency candidates (f1) through (fL) is used for transmitting the digital test data and the check sum data shown in FIG. 5 from the base unit 10 to each of all the five handsets 11–15. Upon receipt of the test data and the check sum data, each of the five handsets 11–15 transmits the test data and the check sum data back to the base unit 10. When receiving the test data and the check sum data in the base unit 10, the data is demodulated in the demodulator 22b, and is supplied via the interface 21 to the error rate calculation portion 35d, which in turn performs an error correcting operation onto errors occurring in the received test data with using the received check sum data. This error correction operation is performed according to a check sum method. The error rate calculation portion 35d then searches errors still remaining in the thus error-corrected test data while referring to the original test data which has been directly transferred to the error rate calculation portion 35d via the interface 21 from the computer 20. The error rate calculation portion 35d then calculates an error rate for communication performed with each handset at each frequency candidate (fi). Thus, the error rate calculation portion 35d calculates five sets of error rates e11 (1 through L), e12 (1 through L), e13(1 through L), e14 (1 through L), and e15 (1 through L) for the five handsets 11–15. The error rate table 35b is for storing therein the thus calculated five sets of error rates. Each set of error rate em (1 through L) ($11 \leq m \leq 15$) is comprised of the total L number of error rates em(1) through em(L), each of which is obtained during a test with a corresponding hopping frequency candidate (fi) ($1 \leq i \leq L$).

The error rate table 35b further stores therein total error rates eT (1 through L). Each total error rate eT(i)($1 \leq i \leq L$) is a sum of the five error rates e11(i), e12(i), e13(i), e14(i), and e15(i) which are obtained during test communication between the base unit 10 and the five handsets 11–15 with the corresponding hopping frequency candidate (fi).

The random number table 35c previously stores therein data of a plurality of random numbers which are used for randomly rearranging the hopping frequency candidates as will be described later.

The test will be described below in greater detail.

The digital test data is created in a test table as shown in FIG. 5, and is comprised of a set of digital test data located from a first address CA00(h) to a last address CA7F(h). For example, the test data has a value of C3(h)=11000011(b) at an address CA00(h), and has a value of 35(h)=00110101(b) at another address CA01(h). In order to search any errors occurring in the test data, the test data is added with vertical and horizontal columns as shown in FIG. 5. The vertical column includes a plurality of horizontal check sums, and the horizontal column includes a plurality of vertical check sums. It is noted that the check sum columns may be provided at other appropriate positions in the data table of FIG. 5.

Each of the horizontal check sums is indicative of the lowermost two digits in the sum of all the test data in the corresponding horizontal row. Similarly, each of the vertical check sums is indicative of the lowermost two digits in the sum of all the test data in the corresponding vertical column. The test data table further stores therein a total check sum "1A" at the lowermost rightmost location. The total check sum "1A" is the lowest two digits in the sum of all the horizontal check sums or all the vertical check sums.

When the test data and the check sum data are prepared as shown in FIG. 5, those data are modulated and transmitted from the base unit 10 to each of the handsets 11–15. When receiving those data, each handset transmits the data back to the base unit 10. When receiving those data, the base unit 10 demodulates the test data and the check sum data, calculates each check sum value for the received test data, and compares the calculated check sum values with the received check sum data.

When all the calculated check sum values are consistent with the received check sum values, the base unit 10 confirms that no error has occurred during the transmission operation. Accordingly, the base unit 10 performs no error correction onto the test data.

When any of the calculated check sum values is inconsisten with the received check sum values, on the other hand, the base unit 10 confirms that some errors have occurred to test data and/or check sum data during the transmission operations. It is noted, however, that there are both types of errors which the base unit 10 can properly correct and which the base unit 10 may not correct. For example, there is a case where the received test data has an error only at its one location. This case will be referred to as first case. In this case, inconsistency will occur between a calculated value and a received value both in a corresponding vertical check sum and a corresponding horizontal check sum. The base unit 10 can therefore correct this error.

There is another case where the received check sum data has an error. This case will be referred to as second case. In this case, the base unit 10 can determine that the error has occurred only in the corresponding check sum data through checking the relationship between the value of the total check sum "1A", the values of all the horizontal and vertical check sums, and all the test data.

There is still another case where the received test data has errors at two locations, CA22(h) and CA24(h), for example, but consistence accidentally occurs between a calculated value and a received value for the corresponding horizontal check sum "C7". This case will be referred to as third case. In this case, the base unit 10 may not know exact positions of these errors merely through checking the horizontal check sums. The base unit 10 will not correct these errors.

There is a further case where the received test data has errors at four locations, CA22(h), CA24(h), CA58(h), and CA5A(h). This case will be referred to as fourth case. In this case, the base unit 10 can know that some errors have occurred in the test data, but may not know which test data have errors. It is impossible to find out these errors through simply comparing the calculated check sums and the received check sums. The base unit 10 may not correct the errors.

When receiving the test data and the check sum data from the handsets, the error rate calculation portion 35d in the base unit 10 calculates an error rate in the following formula (1):

$$\text{error rate } em(i) = \text{(the number of detected errors)/(the total number of data transmitted)} \quad \ldots (1)$$

Thus, the error rate calculation portion 35d does not correct any errors existing in the received test data, but directly calculates the error rate of the received test data. Thus, the error rate calculation portion 35d is provided for simply detecting, using the error-detecting code (check sum data), errors existing in the received test data and for calculating the error rate based on the amounts of the detected errors and the total amounts of test data.

This error rate calculation is repeatedly performed while the test data and the check sum data are repeatedly transmitted at the hopping frequency candidates (f1)–(fL) to all the handsets 11–15. As a result, the error rate calculation portion 35d obtains all the error rates e11(1 through L), e12 (1 through L), e13 (1 through L), e14 (1 through L), and e15 (1 through L). The error rates are stored in the error rate table 35b as shown in FIG. 4. Then, the error rate calculation portion 35d calculates, for each hopping frequency candidate (fi) ($1 \leq i \leq L$), the total value eT(i) of the five error rates e11(i) through e15(i). The thus calculated total values eT(1)–eT(L) are also stored in the error rate table 35b as shown in FIG. 4.

Figure 6:
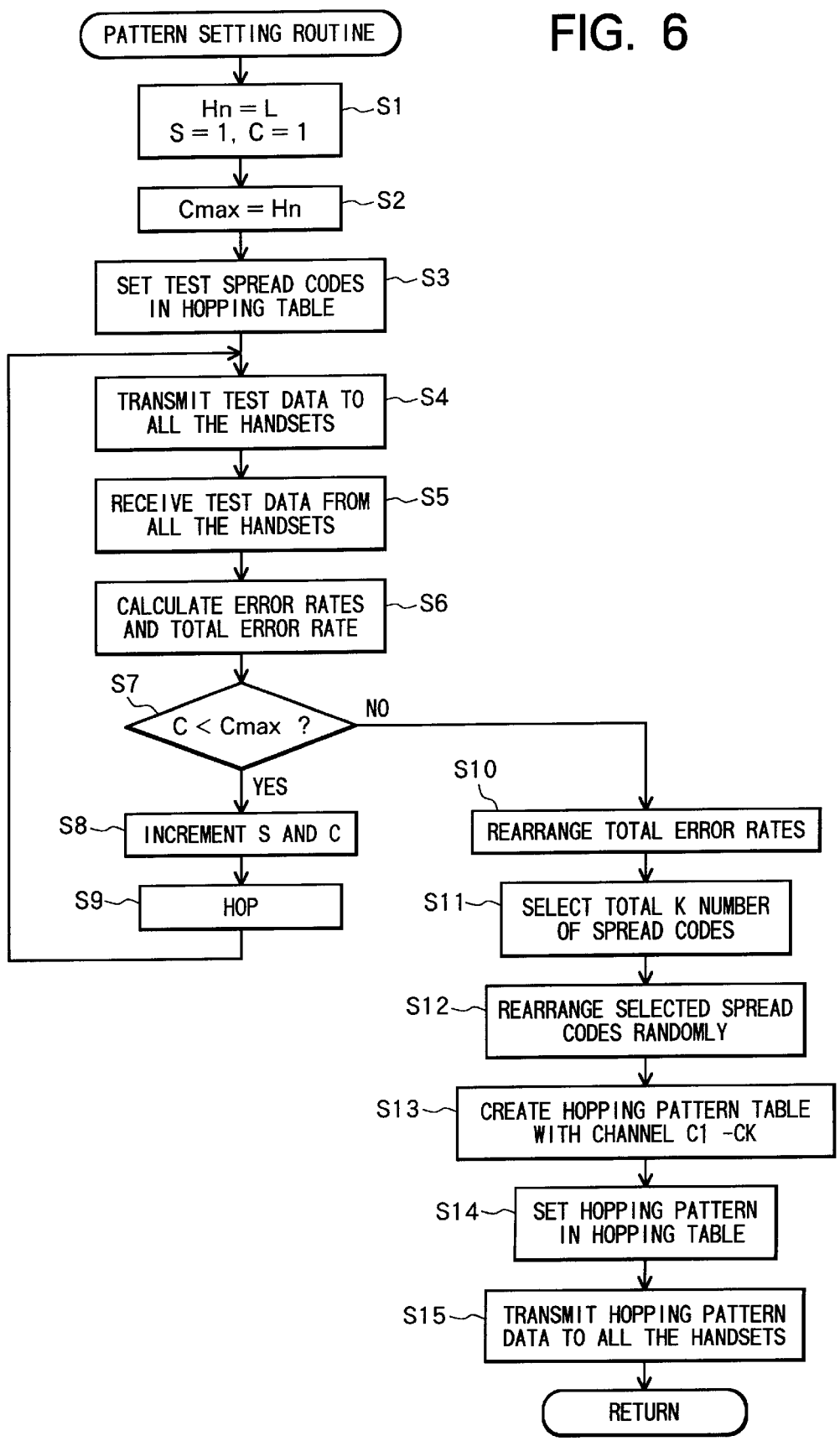
FIG. 6 is a flowchart of a hopping pattern setting routine.
Figure 8:
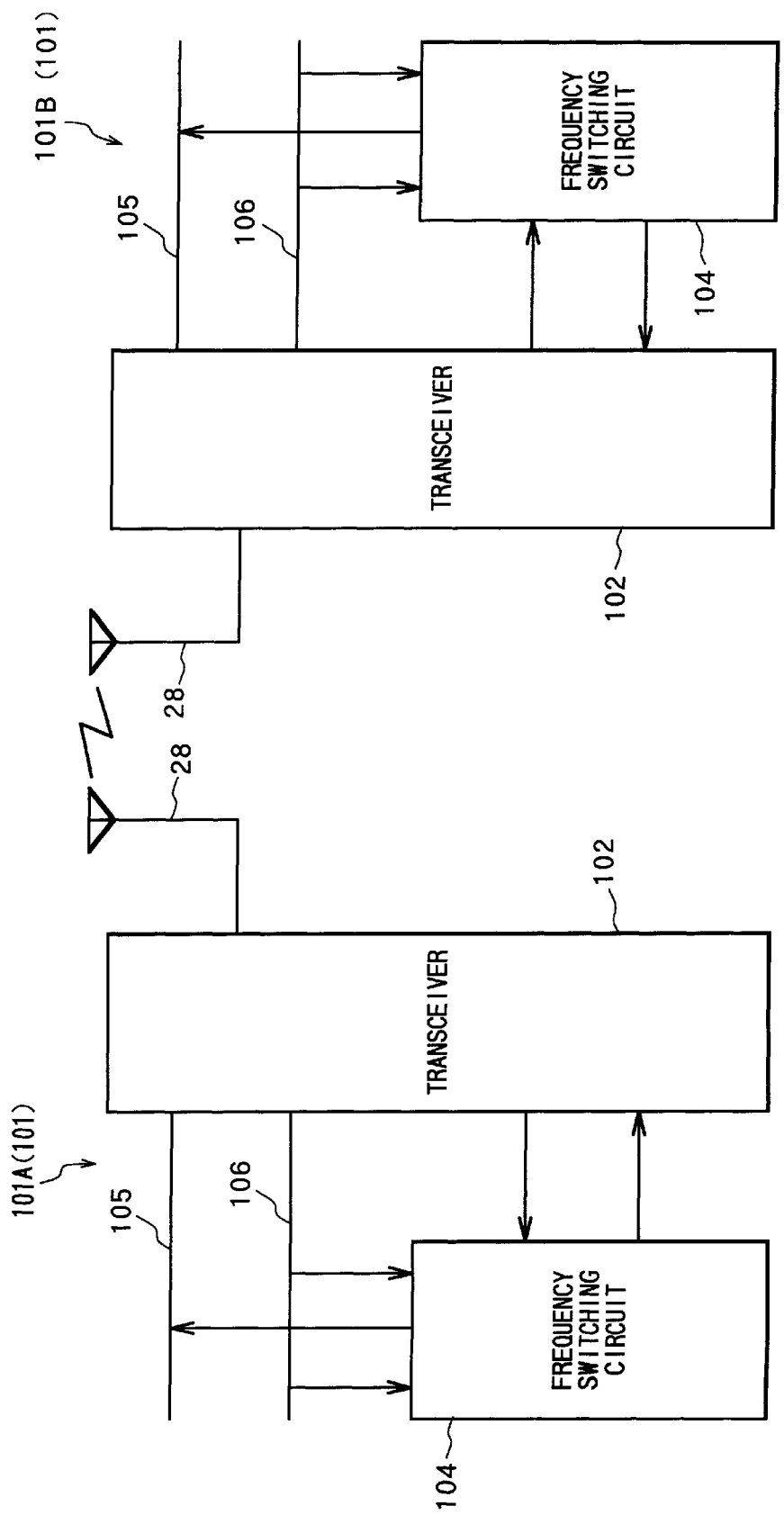
FIG. 8(a) is a block diagram of a pair of wireless communication devices according to a second embodiment.
FIG. 8(b) is a block diagram of a transceiver circuit 102 of each communication device of FIG. 8(a)
Figure 8:
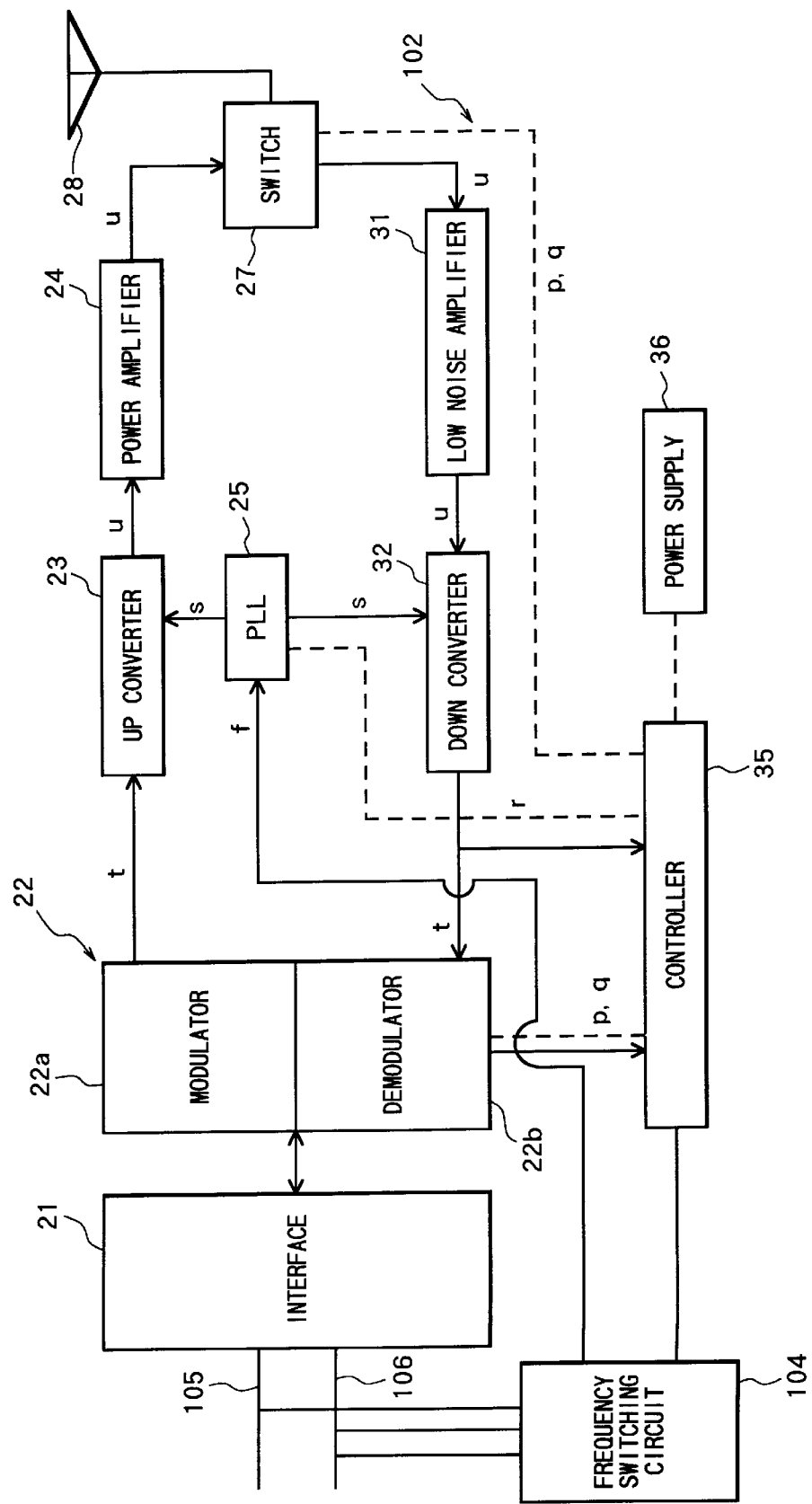

With the above-described structure, the controller 35 performs a hopping pattern setting routine shown in FIG. 6. This hopping pattern setting routine is repeatedly performed at a predetermined time interval. Alternatively, the hopping pattern setting routine may be performed when a user manipulates a pattern setting switch or the like (not shown) provided to the base unit 10. During the hopping pattern setting routine, the test data and the check sum data shown in FIG. 5 are modulated and transmitted from the base unit 10 to the handsets 11–15 with the hopping frequency candidates which are successively hopped among the values (f1) to (fL). When receiving the test data and the check sum data, each of the handsets 11–15 transmits them back to the base unit 10. Upon receipt of the thus returned test data and check sum data, they are demodulated and then transferred via the interface 21 to the error rate calculation portion 35d. The error rate calculation portion 35d then calculates the error rates e11 (1 through L) through e15 (1 through L), and calculates the error rate sums eT (1 through L) as test data recognition rates for the respective hopping frequency candidates (f1) through (fL). Then, the controller 35 selects, from all the candidates (f1)–(fL), those hopping pattern candidates that have attained low total error rates eT. The selected hopping pattern candidates are arranged as a hopping pattern, which will be used as hopping frequencies for communication processings to be performed thereafter.

The hopping pattern setting operation will be described below in greater detail with reference to the flow-chart of FIG. 6.

The controller 35 starts the pattern setting routine when the timer (not shown), internally provided to the controller 35, indicates that a predetermined time period has elapsed after the latest-performed pattern setting routine. The controller 35 may start the pattern setting routine also when the controller 35 detects that an operator manipulates the pattern setting switch provided to the base unit 10.

When the routine starts, in S1, a channel setting value S is set to one (1), and a channel count value C is set to one (1). The total hop number Hn is set to the total number of channels L stored in the hopping frequency data table 35a. Next, in S2, the maximum channel count number Cmax is set to the total hop number Hn which is now set to the number L. Then, in S3, the test hopping frequency data f1 through fL are set in the hopping table 26 in correspondence with the channels C1 through CL. During the process of S3, the controller 35 issues a data setting signal w, indicative of the channel data C1 through CL and the test hopping frequency data f1 through fL stored in the hopping frequency data table 35a.

Next, in S4, the controller 35 outputs a transmission instruction signal p both to the modem 22 and to the transmission/reception switch 27. As a result, the modulator 22a is brought into an operable condition, and the switch 27 is brought into a transmission state. Then, the controller 35 outputs a hopping signal r indicative of the present channel setting value S of one (1) both to the hopping table 26 and to the PLL oscillator 25. As a result, the hopping table 26 outputs, to the PLL oscillator 25, test hopping frequency data f1 of the first channel C1. The PLL oscillator 25 generates a hopping frequency signal s with its frequency being equal to a hopping frequency candidate (f1) which corresponds to the hopping frequency data f1. The hopping frequency signal s is supplied both to the up converter 23 and to the down converter 32.

Then, the test data and the check sum data shown in FIG. 5 are produced in the computer 20. A test signal including both the test data and the check sum data is supplied both to the modem 22 and to the controller 35 via the interface 21. The controller 35 stores the test data and the check sum data in its internal memory (not shown). When receiving the test signal, the modulator 22a modulates the test signal and supplies the modulated test signal to the up converter 23 as a modulation test signal t. The up converter 23 multiplies the modulation test signal t with the hopping frequency signal s which is supplied from the PLL oscillator 25, thereby producing a frequency-spread modulation test signal u. The spread modulation test signal u is amplified in the power amplifier 24, before being transmitted to all the handsets 11–15 from the antennae 28 via the switch 27.

When the transmission of the test data is completed, the program proceeds to S5 where the controller 35 outputs a reception instruction signal q both to the modem 22 and to the transmission/reception switch 27. As a result, the demodulator 22b is brought into an operable condition, and the switch 27 is brought into a reception state. When receiving the test signal u, each of the handsets 11–15 transmits the test signal back to the base unit 10. Thus, the base unit 10 receives the test signal u transmitted back from all the handsets 11–15. The received test signal u is supplied via the antennae 28 and the switch 27 to the low noise amplifier 31. The low noise amplifier 31 amplifies the test signal u and supplies the test signal to the down converter 32. The down converter 32 multiplies the test signal u with the hopping frequency signal s with the hopping frequency candidate (f1), thereby creating a frequency-despread test signal t. The test signal t is supplied to the demodulator 22b. The demodulator 22b demodulates the test signal t into test data and check sum data. The test data and the check sum data are supplied to the error rate calculation portion 35d.

Then, in S6, the error rate calculation portion 35d corrects errors in the received test data with using the received check sum data, and then calculates, based on the formula (1), error rates e11(1), e12(1), e13(1), e14(1), and e15(1) which indicate error rates of communication with all the five handsets 11–15 at the hopping frequency candidate (f1). The error rates are stored in the error rate table 35b as shown in FIG. 4. Then, the sum eT(1) of all the error rates e11(1) through e15(1) is calculated and is stored also in the table 35b.

Next, it is judged in S7 whether or not the present channel count value C is smaller than the maximum channel count value Cmax (=L). When C<Cmax (yes in S7), the channel setting value S and the channel count value C are incremented by one in S8.

Then, when the timer (not shown) internally provided to the controller 35 indicates that a predetermined holding time elapses from the latest hopping timing, the controller 35 outputs a hopping signal s of the present channel setting value S both to the hopping table 26 and to the PLL oscillator 25, thereby allowing hopping of the hopping frequency to the next candidate (f2) in S9. Then, the program returns to S4, and the test data transmission operation is performed with a hopping signal s with the hopping frequency candidate (f2). As a result, the controller 35 calculates error rates e11(2), e12(2), e13(2), e14(2), and e15(2) which indicate error rates of transmission at the hopping frequency candidate (f2). The total error rate eT(2) is also calculated. These error rates are stored in the error rate table 35b.

Thus, test data transmission is repeatedly performed while successively using the total L number of hopping frequency candidates (f1) to (fL). Error rates e11(i) through e15(i) are calculated for each hopping frequency candidate fi. Total error rates eT(1) through eT(L) are obtained for all the frequency candidates (f1) to (fL). At that time, the process for S7 results in a negative judgment (C=Cmax), and the program proceeds to S10.

In S10, the total error rates eT(1) through eT(L) are rearranged as shown in FIG. 7(a) in an order of their magnitudes. The corresponding test hopping frequency data (spread codes) f1 through fL are rearranged together with the total error rates eT(1) through eT(L). In this example, the total error rate eT(5) has the minimum value among all the error rates eT(1) through eT(L). Accordingly, the error rate eT(5) and the corresponding frequency data f5 are located at the first, uppermost position in the table as shown in FIG. 7(a). The total error rate eT(8) having the second smallest value is located next to the error rate eT(5) together with the corresponding frequency data f8. The total error rate eT(243) having the maximum value among the total error rates eT(1) through eT(243) is located in the lowermost position together with the corresponding frequency data f243. Thus, the total L number of total error rates eT(1)–eT(L) are rearranged in the order of their amounts or magnitudes from the minimum amount to the maximum amount as shown in FIG. 7(a) together with their corresponding hopping frequency data f1–fL. In other words, the test hopping frequency data f1–fL are arranged in the order of the degree of their reliability for communication.

Then, in S11, the hopping frequency data f5 through f125, which are now arranged first through k-th in the table of FIG. 7(a), are selected and stored as shown in FIG. 7(b). That is, the total K number of hopping frequency data, which have attained the error rates eT of the smallest through K-th smallest amounts, are selected. It is noted that K is an integer higher than one (1) and lower than L. Next, in S12, the thus selected total K number of frequency data are rear-ranged as shown in FIG. 7(c) at random according to random data supplied from the random number table 35c. Thus, a set of hopping frequencies is created from the frequency data f125 to the frequency data f11 as shown in FIG. 7(c).

Next, in S13, the total K number of channels C1 through CK are allocated to the thus arranged frequencies f125 to f11. As a result, a hopping pattern data is created in which hopping frequency data f125 to f11 are arranged in correspondence with the channels C1 to CK. Then, in S14, the controller 35 transfers the thus created hopping pattern data as a data setting signal w to the hopping table 26. As a result, the hopping pattern data shown in FIG. 7(c) is set in the table 26. In S15, the hopping pattern data is also transmitted to the handsets 11–15. As a result, the hopping pattern data is set in the hopping table 26 in each of the handsets 11–15. Thus, the base unit 10 and the handsets 11–15 can perform thereafter communication while hopping the carrier wave frequency according to the hopping frequency data f125–f11, which have been confirmed as capable of providing highly reliable communication.

As described above, according to the present embodiment, test hopping frequency data stored in the hopping frequency data table 35a is set in the hopping table 26 as a data setting signal w. Digital test data is transmitted while the carrier wave frequency hops according to the test hopping frequency data thus set in the hopping table 26. Frequency candidates which have attained high recognition rate are selected as a carrier wave hopping pattern, and are set in the hopping table 26. Bi-directional communication will be performed thereafter while the carrier wave frequency hops according to the thus produced hopping pattern. That is, when data desired to be transmitted is received via the interface 21, the data is modulated in the modulator 22a into a modulation signal t. The modulation signal t is multiplied with a hopping signal s whose frequency hops according to the hopping frequency data f125–f11 now stored in the table 26. The modulation signal t is thus converted into a frequency spread signal u, which is transmitted to a remote communication device. When receiving a frequency spread signal u from a remote communication device, on the other hand, the signal u is multiplied with the signal s, and converted back to a modulation signal t. The modulation signal t is demodulated before being outputted via the interface 21.

Thus, according to the present embodiment, digital test data is repeatedly transmitted from the base unit to the handsets while successively hopping a frequency among a plurality of hopping frequency candidates (f1)–(fL) which correspond to the test hopping frequency data f1–fL as shown in FIG. 4. When receiving the digital test data transmitted back to the base unit, the process of S1–S11 is performed to select the hopping frequency candidates (f5)–(f125) that are confirmed as capable of providing high recognition rates eT5–eT125. The process of S13–S15 is then performed to create a hopping pattern based on the selected frequency candidates.

In the above description, the error rates eT are used as test data recognition rates at the respective frequency candidates. However, the number of errors, occurred at the transmission with each frequency candidate, may be used as the test data recognition rate for the corresponding frequency candidate.

As described above, according to the present embodiment, the test data recognition rate, indicative of the communication reliability, is determined based on the total error rates et(1)–eT(L). The total error rates et(1)–eT(L) are determined on errors occurring in digital values, which are not affected from the power levels of the communication devices, any electric wave troubles, the location of the communication devices, or the like. Accordingly, even with a simple circuit structure, the communication device of the present embodiment can perform the testing operation and can accurately determine hopping frequencies which are capable of providing a highly reliable communication. The communication device can attain the testing operation in a sufficiently unlimited condition. After the testing operation, the communication device can perform a highly reliable communication with the thus accurately determined hopping frequencies.

Especially, the process of S12 is attained to rear-range the selected frequencies f5–f125 in a random order. Accordingly, in an actual communication operation performed after the testing operation, communication is performed according to the randomly-arranged hopping frequencies. Privacy is highly reliable protected.

Especially when the pattern setting routine of FIG. 6 is designed to be repeatedly performed at the predetermined time interval, the hopping pattern is repeatedly created at the time interval. Accordingly, the hopping pattern is repeatedly updated at the predetermined time interval into those hopping frequencies that are newly confirmed so as not to suffer from any interference with external disturbing signals. It is possible to continue high quality communication.

In the above description, check sum data is used as error correction codes. However, other various data, such as BCH codes and Read-Solomon codes, can be used as error correction codes. Also in these cases, the error rate calculation portion 35d first searches any errors in the received test data, corrects the error test data through a corresponding error correction method, and then compares the corrected data with the original test data, thereby calculating the error rate.

In the above description, the hopping frequency candidates (f5)–(f125) are selected in the order of their error rate amounts from the minimum to the maximum. However, other various methods can be employed to select the hopping frequencies. For example, each of the error rates eT(1)–eT(L) may be compared with a predetermined threshold. Frequency candidates, whose error rates being smaller than the threshold, may be selected as the hopping frequencies. In this case, it is possible to perform communication with reliability which is confirmed higher than the predetermined threshold. It is possible to select the K number of frequency candidates from a greater number of frequency candidates in comparison with the case where the hopping frequencies are selected merely in the order of the error rate amounts. The hopping created from the thus selected hopping frequencies can more reliably protect privacy.

The controller 35 in each of the base unit 10 and the handsets 11–15 may be provided with an error correcting unit for correcting errors occurred in its received data. For example, every time data is transmitted in an actual data communication, the data is added with error correction codes. When receiving the data, the error correcting unit corrects errors occurring in the data with the use of the error correction codes. The correcting unit can employ various correcting methods such as the check sum method. A limit error rate is determined for the error correcting method employed in the error correcting unit. The limit error rate is defined by a rate of the amount of data, which may be corrected according to the corresponding correcting method, with respect to the total amount of data. In this case, the predetermined threshold value may be set smaller than the limit error rate by a predetermined small value. With this structure, even when error occurs to data being transmitted, the controller 35 at the received side communication device can sufficiently correct those errors. A higher reliable communication can be attained. A higher quality communication can be attained with a hopping pattern which in created so as not to produce errors with error rates higher than the limit error rate.

A second embodiment will be described below with reference to FIGS. 8(a) through 13.

Figures 10A, 10B:
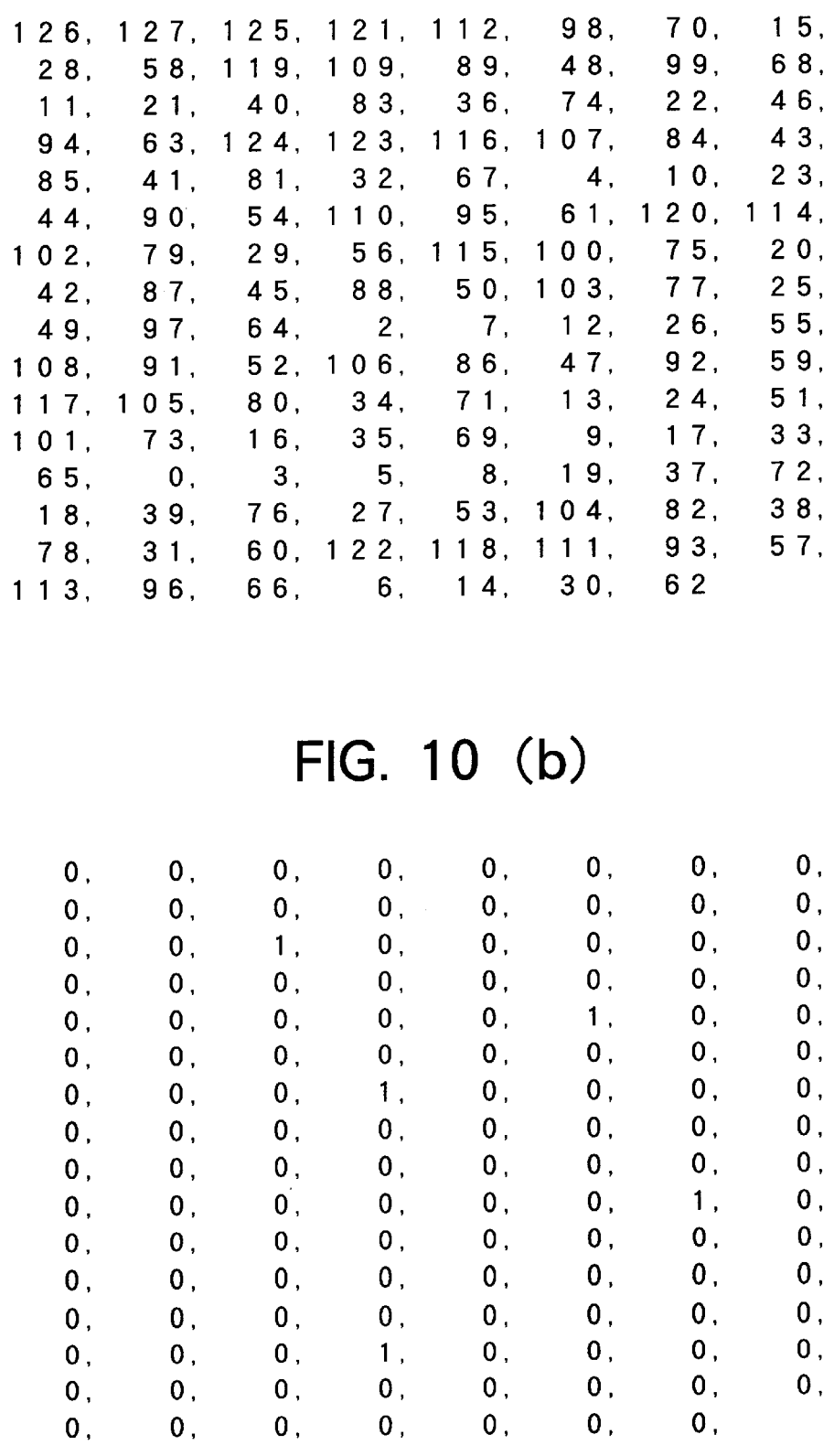

In the first embodiment, the hopping pattern table 26 is set through performing a test with test data and error correction data. After the hopping pattern table 26 in thus properly set, actual communication is performed. Contrarily, according to the present embodiment, a hopping pattern table 110a in initially sat in the communication device. The hopping pattern table 110a stores therein a plurality of hopping frequency data (spread codes) as shown in FIG. 10(a). Each frequency data indicates a hopping frequency. The communication device also stores therein an operational State table 110b. As shown in FIG. 10(b), the operational state table 110b stores attributes or flags indicative of reception states of communication at each of the plurality of hopping frequencies stored in the table 110a. A flag of zero (0) indicates that latest-performed communication at the corresponding hopping frequency was good. A flag of one (1) indicates that latest-performed communication at the corresponding hopping frequency was bad. According to the present embodiment, therefore, actual a communication is performed with only those hopping frequencies that have attributes of zero in the table 110b. Every time communication is performed with one hopping frequency whose flag has a value of zero (0), the state of the communication is detected at a received side. According to the detected result, the flag is reset. When the reception state is detected an good, the flag is maintained as zero (0). When the reception state is detected as bad, the flag is set to one (1). When the corresponding flag is thus set to one (1), the corresponding hopping frequency will not be used thereafter.

A communication device according to the present embodiment will be described below.

FIG. 8(a) above a pair of frequency hopping communication devices 101A and 101B of the present embodiment. The communication devices 101A and 101B perform bidirectional communication therebetween according to the frequency hopping spread spectrum method.

The frequency hopping communication devices 101A and 101B have the same structure. Each device 101A and 101B has a transceiver circuit 102 for performing transmission/reception operation at a plurality of hopping frequencies. As shown in FIG. 8(b), the transceiver circuit 102 has the same structure as that of FIG. 1 of the first embodiment except that the transceiver circuit 102 does not include the hopping table 25 and except that the controller 35 does not include the tables 35a–35c or the error rate calculating portion 35d.

With this structure, the transceiver circuit 102 performs both transmission and reception operations in a similar manner as in the first embodiment. That is, when data to be transmitted is inputted via a transmission data path 105 at the interface 21, the controller 33 in the transceiver 102 controls the modulator 22a to modulate the inputted data into a modulation signal t. The controller 35 also controls the up converter 23 to multiply the modulation signal t with a hopping frequency signal a supplied from the PLL circuit 25, thereby creating a frequency-spread modulation signal u. The frequency-spread modulation signal u is amplified by the power amplifier 24 before being transmitted via the switch 27 and the antennas 28.

When receiving a frequency-spread modulation signal u from the other communication device, the signal u is supplied to the low noise amplifier 31 via the antennae 28 and the switch 27. The signal u in amplified in the amplifier 31 and then is multiplied by the frequency hopping signal a supplied from the PLL circuit, 25, thereby creating a frequency-despread modulation signal t. The signal t is then demodulated at the demodulator 22b. The demodulated data is supplied via the interface 21 to the external circuit via a reception data path 106.

Each communication device 101 also has a frequency switching circuit 104 which in connected to the PLL circuit 25 in the transceiver 102. The frequency switching circuit 104 is for successively supplying a plurality of sets of hopping frequency data f which indicate a plurality of hopping frequencies, in response to the hopping frequency data f, the PLL circuit 25 generates a frequency-hopping signal a with a corresponding frequency.

Figure 9:
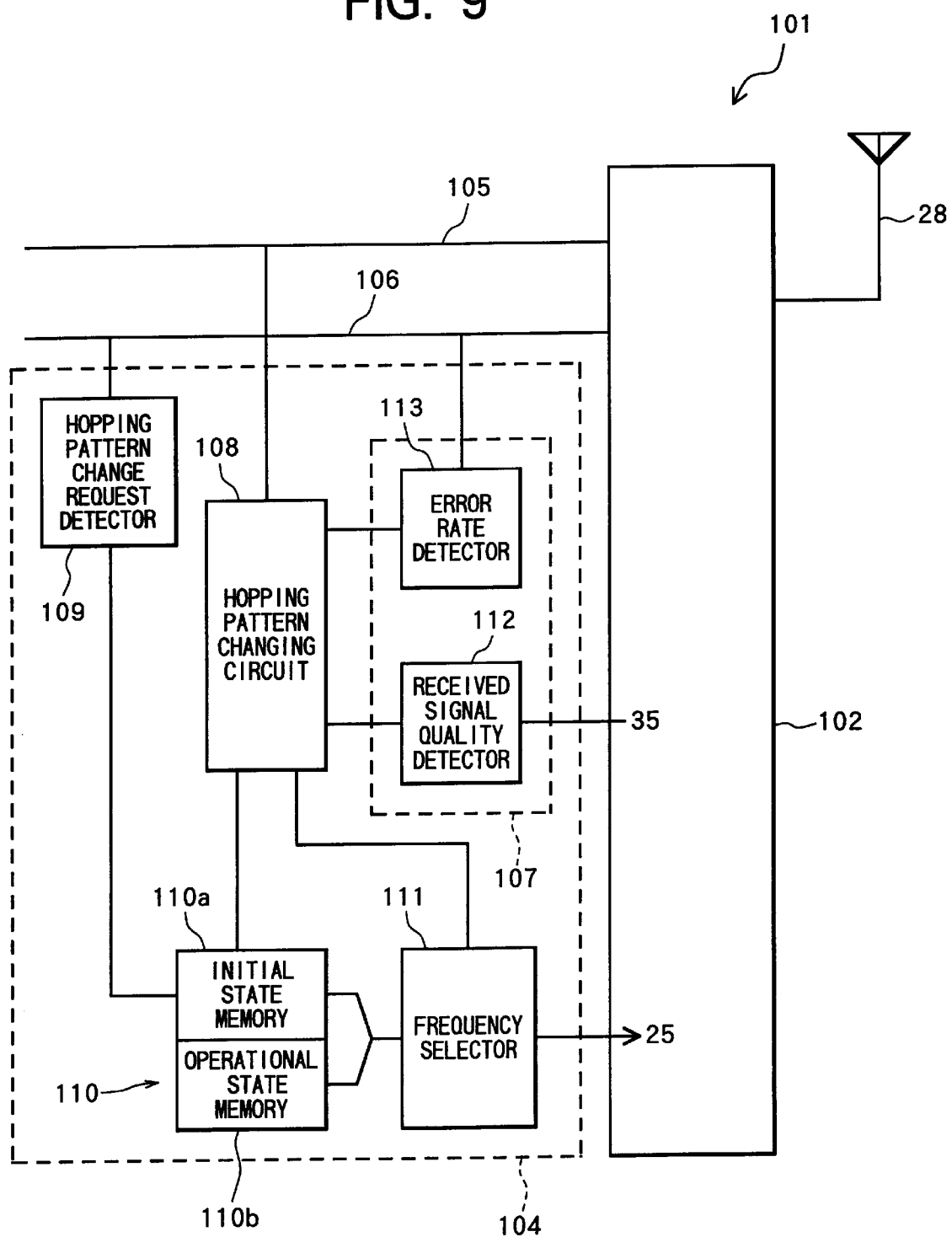
FIG. 9 is a block diagram of a frequency switching circuit 104 of each communication device of FIG. 8(a)

The structure of the frequency switching circuit 104 will be described below with reference to FIG. 9.

The frequency switching circuit 104 in connected also to the transmission data path 105 and the reception data path 106.

The frequency switching circuit 104 includes a monitor circuit 107 which is connected to the reception data path 106 and to the controller 35 In the transceiver 102 for monitoring the received data; a storage unit 110 for storing the frequency hopping pattern table 110a and the operational state table 110b; a hopping frequency selection circuit 111 for selecting a hopping frequency data f from the table 110a and for supplying the hopping frequency data f to the PPL circuit 25; a hopping pattern changing circuit 108 for changing the content of the table 110b based an the results monitored by the monitor 107 and for outputting a change request signal via the transmission data path 106 to the transceiver 102; and a hopping pattern change request detection circuit 109 for receiving a change request signal transmitted from the remote communication device via the reception data path 106.

The monitor 107 is for measuring the reception state at each frequency, The monitor 107 is constructed from a reception quality detection circuit 112 and an error rate detection circuit 113.

The reception quality detection circuit 112 is connected to the controller 35 in the transceiver circuit 102, and for monitoring a RSSI (Receive Signal Strength Indicator) signal indicative of the strength of a signal received at the transceiver 102 and a signal indicative of quality of the reception signal to be outputted from the demodulator 22b. The quality of the reception signal indicates how the reception signal is not affected by some interference or jamming by external communication disbursing signals. The quality of the received signal is represented by a degree how the received signal can be successfully demodulated by the demodulator 22b. According to the present embodiment, as shown in FIG. 8(b), the down converter 32 and the demodulator 22b are connected to the controller 35. The down converter 32 supplies a frequency-despread signal t both to the demodulator 22b and to the controller 33. Upon receipt of the signal t, the controller 35 produces a RSSI signal indicative of the strength of the signal t, and supplies the RSSI signal to the reception quality detection circuit 112. The demodulator 22b outputs, to the controller 35, a signal indicative of the degree how the demodulator 22b successfully demodulated the signal t. The controller 35 transfers the demodulation degree indicating signal to the reception quality detecting circuit 112. It is noted that the controller 35 may directly transfer the received signal t to the circuit 112. The circuit 112 may detect the strength of the received signal t.

The reception quality detection circuit 112 thus monitors the strength and quality of the received signal, and determines whether or not any troubles are occurring or will likely occur during communication with the present hopping frequency. The reception quality detection circuit 112 supplies the determined results to the hopping pattern changing circuit 108.

The error rate detector 113 is connected to the reception data path 106 and f or monitoring the received data which is demodulated by and outputted from the demodulator 22b. The error rate detector 113 calculate an error rate of the reserved data. That is, because data is constructed from actual data and error correction code data, the error rate detector 113 detects some errors included in the actual data and calculated a rate of the error amount with respect to the total data amount. Based on the calculated result, the error rate detector 113 date as whether any troubles are occurring or will likely occur during communication with the present hopping frequency. The error rate detection circuit 113 supplies the determined results to the hopping pattern changing circuit 108.

The hopping pattern changing circuit 108 is for changing the content of the reception state table 110*b* when it is informed from at least one of the circuits 112 and 113 that some communication troubles are occurring or will likely occur at a certain hopping frequency.

The storage unit 110 is constructed from a non-volatile memory such as an EEPROM. The storage unit 110 is constructed from the hopping pattern memory 110*a* and the operational state memory 110*b*. The hopping pattern memory 110*a* previous stores therein a hopping table, in which a plurality of hopping frequency data are arranged in a matrix shape as shown In FIG. 10(*a*). The operational state memory 110*b* is for storing a reception state of each hopping frequency data which is determined by both the circuits 112 and 113.

As shown in FIG. 10(*c*), the hopping pattern table 110*a* stores therein a plurality of (127, in this example) hopping frequency data numbers f which are generated according to spread Read-Solomon codes. The hopping frequency data numbers are stored from address one (1) to address 127. Each hopping frequency data f indicates a corresponding hopping frequency (f).

The operational state memory 110*b* stores therein reception states of communication actually performed at all the hopping frequencies stored in the table 110*a*. The reception states are arranged in the table 110*b* at addresses one (1) to 127 in correspondence with the frequency data stored in the hopping pattern table 110*a*. In this example, reception state flags are stored as shown in FIG. 10(*b*) according to the reception states measured at the monitoring circuit 107. For example, the flag at the first address in the memory 110*b* indicates the reception state of the communication performed with the frequency data at the first address in the memory 110*b*. It is noted that when the communication device 101 is initially shipped to a user, all the flags stored in the table 110*b* have values of zero (0). Then, communication is performed while hopping the frequency of the frequency-hopping signal s among the frequencies indicated by the frequency data numbers stored in the memory 110*a*. If at least one of the circuits 112 and 113 at a reception side device detects that troubles are occurring or will likely occur at some frequency, the hopping pattern changing circuit 108 turns the flag from zero (0) to one (1) at an address of the table 110*b* corresponding to the subject hopping frequency data. On the other hand, if the monitor 107 detects that good communication is attained with that frequency, the flag of zero (0) is maintained Thus, the reception state flags rare selectively updated according to the results of measurements by the monitor 107 during every communication process.

It is noted that when the hopping pattern changing circuit 108 changes the flag for the present hopping frequency, the hopping pattern changing circuit 108 also performs to transmit data of the changed content of the reception state table 110*b* as a change request signal to a remote communication device which Is now during a transmission mode. That is, the hopping pattern changing circuit 108 outputs the change request signal via the transmission data path 105 to the transceiver circuit 102, from which the change request signal is transmitted to the remote communication device. This change request signal transmission operation is performed during a blank period provided after the communication with the present hopping frequency is ended and before the frequency hops from the present frequency to the next frequency and communication with the next frequency is started. It is noted that the blank period in provided every time the hopping frequency hops to the next frequency. For example, when frequency hopping is attained at a time interval of 10 ms, data communication operation is performed for 9 ms, and a blank period of 1 ms is provided between every data communication operation.

The change request signal is for causing the remote communication device at the transmission side to change the corresponding flag in the table 110*b*. That is, the hopping pattern change request detecting circuit 109, connected to the reception data path 106, receives the change request signal. When receiving a change request signal, the circuit 109 changes the content of the operational state table 110*b* in accordance with the content of the change request signal.

The hopping frequency selection circuit 111 is for referring to both the flags in the memory 110*b* and the hopping frequency data f in the memory 110*a,* and for successively selecting hopping frequency data f whose corresponding flags have values of zero (0) in the table 110*b*. That is, the hopping frequency selection circuit 111 successively selects frequency data f that are not confirmed an providing communication troubles. The hopping frequency selection circuit 111 supplies the thus selected frequency data f to the PLL circuit 25 in the transceiver circuit 102.

In the communication system with the above-described structure, data communication in performed as will be described below.

When transmitting data from the communication device 101A to the other device 101B, the frequency selecting circuit 111 in the device 101A successively selects the hopping frequency data f according to the contents of the memories 110*a* and 110*b*. The thus selected hopping frequency data f is supplied to the PLL circuit 25 in the transceiver 102. As a result, transmission operation is performed with a hopping frequency corresponding to the supplied hopping frequency data f.

When the thus transmitted signal is received by a remote communication device 101B at the reception mode, the communication device 101B performs a reception operation as described below.

When receiving the transmitted signal via the antennas 28, both of the reception quality detecting circuit 112 and the error rate detecting circuit 113 monitor the reception state. That in, the reception quality detecting circuit 112 detects the received signal strength and the received signal quality. The error rate detecting circuit 113 calculated an error rate of data which is obtained through demodulating the received signal. Bach of the circuits 112 and 113 then judges whether or not the present hopping frequency has occurred any communication troubles or will likely occur any communication troubles.

When at least one of the circuits 112 and 113 detects that the present hopping frequency has occurred some troubles or will likely occur some troubles, the corresponding circuit informs the hopping pattern changing circuit 108 that the present frequency should not be used. When receiving this information, the hopping pattern changing circuit 108 changes, Into one (i), a flag in the table 110*b* at a location corresponding to the present hopping frequency data f, thereby renewing the table 110*b*.

Then, during a blank period prior to the next communication period with the next hopping frequency, the hopping pattern changing circuit 108 controls the frequency selecting circuit 111 to detect the reception state at the prevent hopping frequency (f) whose flag has just turned to one (1) as described above. The frequency selecting circuit 111 performs this detection operation through controlling the transceiver circuit 102 and the antennae 28 to perform reception operation with the present frequency (f). Because no data is now being transmitted from the remote communication device 101A, it is possible to detect background noises and external signals at the present frequency (f) The hopping pattern changing circuit 108 changes, back into zero (0), the flag of the present hopping frequency if the reception state is detected as recovered. That is, the flag is set back to zero if sufficiently small amounts of noises and sufficiently small amounts of external signals are detected at the present frequency. On the other hand, if large amounts of background noises or external signals are detected, it is determined that the receiving state in not recovered. Accordingly, the hopping pattern changing circuit 108 supplies a change request signal to the transmission data path 105 during the blank period in order to cause the device 101A at the transmission side to change its table 110$b$ into the same state as the presently-changed table 110$b$ at the device 101B.

At the device 101A of the transmission side, when receiving the change request signal, the hopping pattern change request circuit 109 changes the storage content of the storage unit 110 Into the same an that in the storage unit 110 at the device 101B.

Thus, when the condition (operational state table 110$b$), based on which the hopping frequency is selected from the hopping table 110$a$, in changed at the receiving side communication device, the change request signal is transmitted from the receiving Bids to the transmission side. Accordingly, the transmission side device and the reception side device will continue using the same hopping frequencies for transmission operation. It in noted that the change request signal can be transmitted bi-directionally between the receiving side and the transmission side.

After the above-described communication operation is terminated, the main power supply 33 in each device 101 is turned off. Each device 101 may possibly be moved from the present location to another location. Even when the main power supply 35 is turned off, the storage unit 110 continues use maintaining the reception states of the latest performed communication because the storage unit 110 in constructed from the non-volatile memory such as the EEPROM. Accordingly, when communication is again started between the communication devices 101A and 101B, the hopping frequency selecting circuit 111 in a communication device of a transmission side (101A for example) selects hopping frequency data f while referring to the contents of the memory 110$b$. Accordingly, even in the initial stage of the present communication, the device 101A can select hopping frequencies that have been detected, during the latest performed communication, as providing high reception strength/quality and a low error rate.

It in assumed that the device 101A starts the present communication after a short period of time has elapsed from when the latest communication was completed or that the device 101A starts the present communication after the device 101A has been moved very little from the site where the device 101A has been located during the latest communication. In this case, It is presumed that communication circumstances, such as external noises, has changed very little. Accordingly, those hopping frequencies, that have been detected during the latest communication as capable of occurring communication troubles, will likely provide communication troubles also during the present communication. According to the present embodiment, however, hopping frequencies are initially selected according to the results detected during the latest communication, a high quality communication can be attained even from the initial stage of the present communication.

Figure 11:
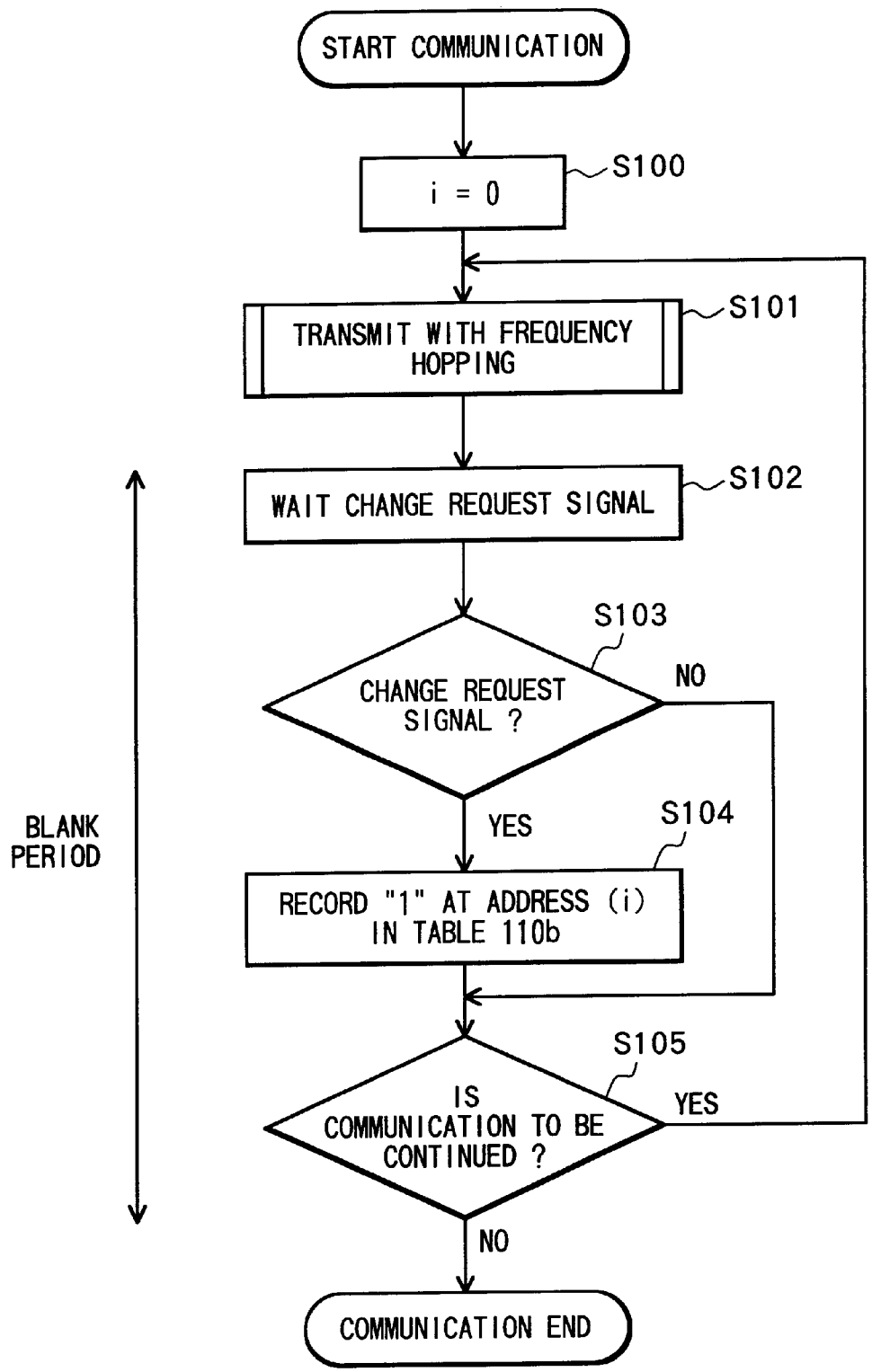
FIG. 11 is a flowchart of transmission operation performed by a communication device at a transmission side.
Figure 12:
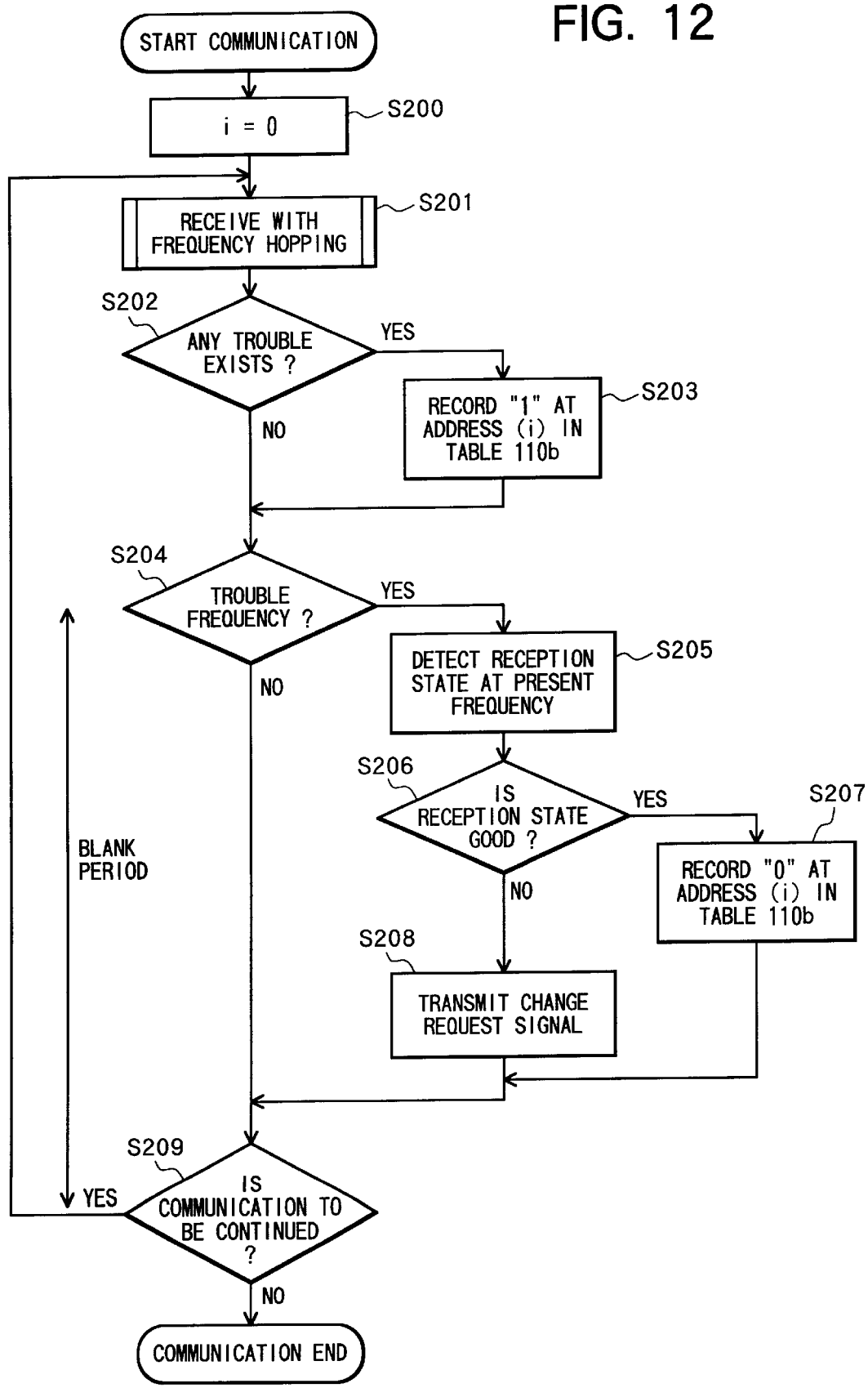
FIG. 12 is a flowchart of reception operation performed by a communication device at a reception side.
Figure 13:
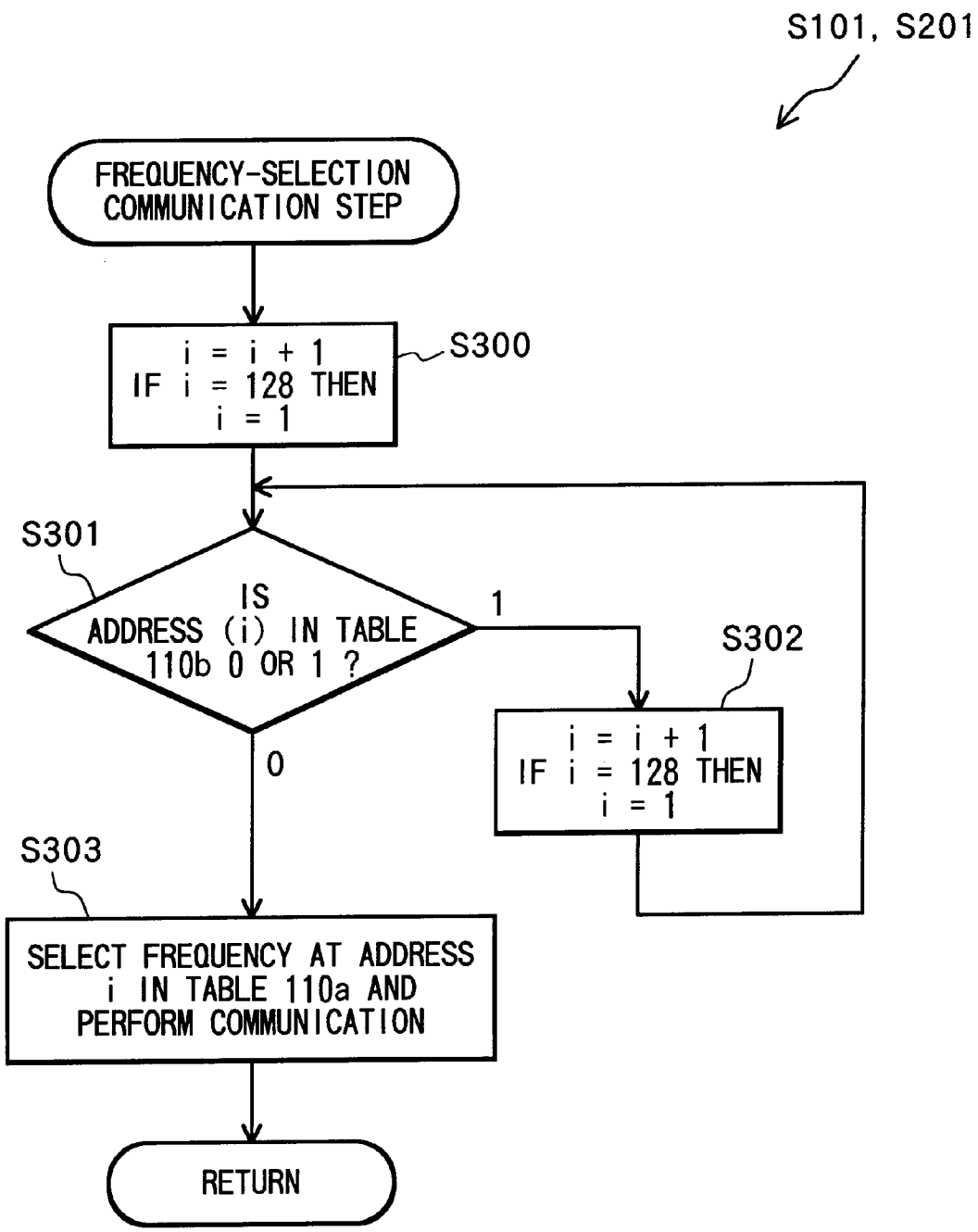
FIG. 13 is a flowchart of each of frequency hopping communication steps S101 and S201 in FIGS. 11 and 12.

The communication devices 101A and 101B perform the above-described operations according to flowcharts of FIGS. 11 through 13.

During a transmission mode, the communication device 101A (or 101B) performs transmission operation as shown in FIGS. 11 and 13. It is assumed that the communication device 101A is now in the transmission mode, and the communication device 101B is now in the reception made.

In the communication device 101A of the transmission side, the address value (i) is first initialized to zero (0) in S100. Then, data transmission operation is performed in S101 so as to transmit desired data signals to the device 101B.

As shown in FIG. 13, during the data transmission process of S101, the frequency selecting circuit 111 first increments the present address (i) by one. The circuit 111 sets the present address (i) to one when the present address becomes equal to 128. The frequency selecting circuit 111 then judges in S301 whether or not the table 110$b$ stores zero (0) or one (1) at the present address (i) When the value of one (1) is stored at the present address (i), it is confirmed that a corresponding hopping frequency data f, that is stored in the table 110$a$ at the same address (i), should not be used. Accordingly, the address (i) is incremented by one in S302. If the present address (i) becomes 128, the address (i) is then brought back to one (1) in S302. When the value of zero (0) is stored at the present address (i), on the other hand, it Is confirmed that the corresponding hopping frequency data fi can be used. The hopping frequency data fi is therefore selected. The hopping frequency data fi is outputted from the frequency selecting circuit 111 to the PPL circuit 25, and data transmission is performed with the thus selected hopping frequency data fi. For example, when i=1. because the flag at the first address in the table 110$b$ is zero as shown in FIG. 10($b$), the hopping frequency data f (=126) at the awe address in the table 110$a$ is used. When i=19, because the flag at the nineteenth address is one, the hopping frequency data f (=40) is not used.

When the data transmission at the present hopping frequency (fi) is completed, a blank period starts. The blank period continues until the next transmission is started with the next hopping frequency. During this blank period, the device 101A at the transmission side waits for a change request signal from the device 101B in S102. When the change request detector 109 receives the change request signal (yes in S103), data "1" is stored in S104 in the table 110$b$ at the present address (i) whose hopping frequency data fi has just bean used. Then, the program proceeds to S105. When no change request signal in received (no in S103), on the other hand, the program directly proceeds to S105. Then, in S105, it is judged whether or not the communication is to be continued. When the communication is to be continued (yes in S105), the program returns to S101. Data transmission is performed while the hopping frequency data is changed from the present hopping frequency data into the next unable hopping frequency data. Thus, data transmission operation in repeatedly performed while the hopping frequency (f) successively hops according the contents in the data storage unit 110. When the communication is not to be continued (no in S105), on the other hand, the communication is ended.

While the communication device 101A performs the above-described transmission operations, the communication device 101D at the receiving side performs the operations as shown in FIGS. 12 and 13.

That is, first, in the same manner as in, the device 101A, the address value (i) in initialized to zero (0) in S200. Then, in S201, the device 101A performs data receiving operation for receiving data transmitted from the device 101A.

This data reception step is performed in the same manner as shown in FIG. 13. That is, the frequency selecting circuit 111 selects the hopping frequency data fi of an address i whose corresponding flag has a value of zero. The selected hopping frequency data fi Is outputted to the PLL circuit 25, and data receiving operation is performed through multiplying a received signal u with the frequency hopping signal s supplied from the PLL circuit 25.

Each of the circuits 112 and 113 in the monitoring circuit 107 detects in S202 whether or not the present frequency has occurred any communication troubles or will likely occur any communication troubles. That is, the reception quality detecting circuit 112 detects the strength and the quality of the received signal, and determines whether the present hopping frequency can be used. The error rate detecting circuit 113 calculates an error rate of data obtained through demodulating the received signal, and determines whether the present hopping frequency can be used. If at least one of the circuits 112 and 113 determines that the present hopping frequency has provided troubles or will likely provide troubles (yes in S202). the pattern changing circuit 108 records data "1" in the table 110b at the present address (i) in S203. Then, the program proceeds to S204. If both of the circuits 112 and 113 determine that the present hopping frequency provides no troubles (no in S202), on the other hand, the program directly proceeds to S204. As a result, the communication with the present hopping frequency is ended.

Then, the blank period is started. The blank period continues until the communication with the next hopping frequency is started. During the blank period, the pattern changing circuit 108 judges in S204 whether or not the pattern changing circuit 108 has just changed the flag in the table 110b. When it is judged that the flag has just been changed (yes in S204), the pattern changing circuit 108 controls the frequency selecting circuit 111 to again detect the reception state at the present hopping frequency in S205. That is, reception operation is performed again with the present frequency, thereby detecting external noises and external signals. The pattern changing circuit 108 then judges in S206 whether or not the thus detected reception state is good. That is, the pattern changing circuit 108 judges whether or not the detected external noises and external signals have sufficiently small amounts. When only small amounts of external noises and external signals are detected, it is confirmed that the reception state is good and therefore the present frequency is considered as usable (yes in S206). It is therefore determined that communication at the present hopping frequency has been recovered. Accordingly, the pattern changing circuit 108 rewrites data "0" in the corresponding address (i) of the table 110b in S207. When large amounts of external noises or external signals are detected, on the other hand, it is confirmed that the reception state is still unacceptable (no in S206). Accordingly, the pattern changing circuit 108 outputs a change request signal in S208. The change request signal is transmitted by the transceiver circuit 102 to the device 101A. Then, it is judged in S209 whether or not the communication is to be continued. When the communication is to be continued (yes in S209), the program returns to S201. Data reception is performed while the hopping frequency data is changed from the present hopping frequency data into the next usable hopping frequency data. Thus, data reception operation is repeatedly performed while the hopping frequency (f) successively hops according the contents in the data storage unit 110. When the communication is not to be continued (no in S209), on the other hand, the program ends.

As described above, according to the present embodiment, the storage unit 110 stores therein a hopping pattern table 110a which stores therein a frequency hopping pattern which is determined as usable according to the predetermined initial condition and an attribute table 110b which is indicative of the received states of the respective frequencies in the frequency hopping pattern. The attributes being determined by the monitoring circuit 107 during the latest communication time. When every communication starts, hopping frequencies are selected while referring to both the predetermined hopping pattern 110a and the attributes 110b.

Thus, communication with a low error rate and with a high intensity level can be attained even during the initial stage of every communication. The condition, based on which the hopping frequencies are selected, is changed according only to setting of the flags in the reception state memory 110b. It is therefore possible to attain noise free communication even with the storage unit 110 of the small storage capacity. Any complicated structures including files, memories, and resistors are not required. The frequency hopping device can be produced less costly.

In the above description, an attribute or a flag is stored for each hopping frequency data according to the detected reception state, such as the calculated error rate and the received signal level. Usable hopping frequencies are selected through comparing the predetermined hopping pattern and the attribute information. However, the measured received state, including the measured error rates and the measured signal levels, can be stored in place of the attribute information. In this case, as the hopping frequency repeatedly hops, the reception states are successively measured and written in the memory 110b. The hopping frequency selecting circuit 111 previously stores therein a predetermined threshold. The circuit 111 compares the measured reception states with the predetermined threshold, thereby selecting hopping frequencies to be used.

The hopping pattern table 110a can be changed through deleting a hopping frequency that is detected as provided a low quality reception state or through adding a new hopping frequency that is measured as provided a high quality reception state.

When data communication is ended and data communication is started next, the data communication is performed while referring to the present content of the storage unit 110. However, the content of the storage unit 110 can be referred also when the data communication is interrupted due to some third party's disturbing signals.

In the above description, the data storage unit 110 is constructed from the non-volatile memory such as the EEPROM. However, the storage unit 110 may be constructed from a volatile memory such as a RAM. In this case, the communication device is provided with a back-up power supply which can supply power to the RAM regardless of whether the main power supply 35 is turned on or off.

Every time communication is started, the communication device refers to information on the received state of the latest communication which is being presently stored in the storage unit. The communication device then determines a hopping frequency to use. However, the device may be additionally provided with a selecting unit for selecting the condition, based on which hopping frequencies will be selected, between the condition determined by the reception state at the latest communication and the initially-determined condition.

For example, the frequency selecting circuit 111 is designed to perform such a selection operation. That is, the circuit 111 is provided with a timer and a back-up power supply which continues supplying power to the timer regardless of whether the main power supply 35 is turned on or off. The timer starts counting time when every communication is completed. If the timer detects that a predetermined time (one hour, for example) or more has elapsed when the present communication starts after the latest communication is ended, the frequency selecting circuit 111 does not refer to the contents in the memory 110b, but merely selects the hopping frequency data which are stored in the hopping pattern memory 110a. In other words, hopping frequency selection is performed according to the predetermined initial condition. This is because all the hopping frequencies, stored in the hopping table 110a, are determined as appropriate at the initial stage when the device is produced and shipped. On the other hand, if the timer detects that the predetermined time has not yet elapsed when the present communication starts after the latest communication is ended, the frequency selecting circuit 111 compares the contents in the memories 110a and 110b in the same manner as described already. In this case, hopping frequency selection is performed according to the reception state detected during the latest performed communication.

In order to perform the above-described operation, every time communication is started, the frequency selecting circuit 111 judges whether or not the predetermined period of time has elapsed after the latest communication has ended. When the predetermined time period or more has elapsed, the frequency selecting circuit 111 clears all the flags in the memory 110b into zero. Then, communication is performed while referring to the memories 110a and 110b in the same manner as described above with reference to FIGS. 11–13. Accordingly, in the initial stage of the communication, hopping frequency selection is performed according to the predetermined initial condition. That is, all the frequency data in the hopping table 110a are used in the initial stage of that communication. When the predetermined time period has not yet elapsed, on the other hand, the frequency selecting circuit 111 does not reset the contents of the memory 110b, but performs the communication while referring to the memories 110a and 110b in the same manner as described above with reference to FIGS. 11–13.

When a long period of time elapses from the latest communication, the communication circumstances such as external noises have largely varied. The communication device may have moved by a long distance from the position where the device has performed the latest communication. In this case, the communication device may not perform high quality communication even when referring to the results measured during the latest communication. It is preferable to select hopping frequencies according to the initially-determined condition. Thus, the selecting circuit 111 determines whether to select hopping frequencies based on the present contents of the tables 110a and 110b or based on the content of the table 110a only.

In the above description, the selecting circuit 111 performs this determination dependent on the period of time the communication device has stopped performing communication. However, the selecting circuit 111 may perform this determination through detecting, by a gyroscope sensor or the like, the distance by which the communication device has moved from when the device performed the latest communication. Alternatively, the selecting circuit 111 may perform this determination in response to a user's manipulation of a switch provided to the device. That is, the user can determine the manner of selecting hopping frequencies between the latest communication state dependent manner and the initially-determined manner. In order to perform this operation, every time communication is started, the frequency selecting circuit 111 receives, from the switch, signals indicative of whether the user desires to perform the hopping frequency selection in the latest communication state dependent manner or in the initially-determined manner. When the user selects the initially-determined manner for frequency selection, the frequency selecting circuit 111 clears all the flags in the memory 110b into zero. Then, communication is performed while referring to the memories 110a and 110b in the same manner as described above with reference to FIGS. 11–13. Accordingly, in the initial stage of that communication, hopping frequency selection is performed according to the predetermined initial condition. That is, all the frequency data in the hopping table 110a are used. When the user selects the latest communication state dependent manner, on the other hand, the frequency selecting circuit 111 does not reset the contents of the memory 110b, but performs the communication while referring to the memories 110a and 110b in the same manner as described above with reference to FIGS. 11–13.

While the invention has been described in detail with reference to the specific embodiments thereof, it would be apparent to those skilled in the art that various changes and modifications may be made therein without departing from the spirit of the invention.

For example, in the first embodiment, the computer 20 is connected to the base unit 10. The test data and the check sum data is prepared by the computer 20 and is supplied to the base unit 10. However, the computer 20 may not be connected to the base unit 10. The base unit 10 may be previously stored with the test data and the check sum data.

What is claimed is:

1. A wireless communication device, comprising:
   communication means capable of performing bi-directional communication with data with carrier wave frequency hopping;
   test control means for controlling the communication means to perform bi-directional test communication with digital test data and error-detecting code, while successively hopping carrier wave frequency among a predetermined plurality of frequency candidates;
   means for calculating, using the error-detecting code, a recognition rate attained onto the digital test data by the bi-directional test communication;
   means for selecting, from the plurality of frequency candidates, several frequency candidates based on the calculated recognition rate for the digital test data;
   means for setting a hopping pattern based on the selected several frequency candidates; and
   communication control means for controlling, after completion of the bi-directional test communication, the communication means to perform bi-directional communication with desired data while successively hopping carrier wave frequency among the set hopping pattern.

2. A wireless communication device as claimed in claim 1, further comprising means for randomly rearranging the selected frequency candidates into the hopping pattern.

3. A wireless communication device as claimed in claim 1, wherein the test control means controls the communication means to repeatedly perform the bi-directional test communication at a predetermined time interval.

4. A wireless communication device as claimed in claim 1, wherein the test control means controls the communication means to perform the bi-directional test communication using the digital test data and check sum data that is defined for the digital test data, according to the predetermined plurality of frequency candidates, wherein the recognition rate calculating means includes means for calculating an error rate of the received test data using the check sum data at each of the plurality of frequency candidates; and wherein the selecting means includes error rate-dependent selection means for selecting several frequency candidates dependent on the calculated error rates.

5. A wireless communication device as claimed in claim 4, wherein the error rate-dependent selection means includes:

means for rearranging data of the plurality of frequency candidates in an order of the magnitude of their error rates, the plurality of frequency candidates including a total L number of frequency candidates where L is an integer higher than one; and means for selecting, from the thus rearranged L number of frequency candidates, K number of frequency candidates from a first candidate that has the minimum error rate and that is located first among the L number of candidates toward a K-th candidate that has the K-th minimum error rate and that is located K-th among the plurality of frequency candidates where K is an integer higher than one and lower than L.

6. A wireless communication device as claimed in claim 4, wherein the error rate-dependent selection means includes means for selecting several frequency candidates whose error rates are smaller than a predetermined threshold.

7. A wireless communication device as claimed in claim 6, further comprising means for correcting errors in received data, the predetermined threshold being set smaller than a limit error rate for the error correction means by a predetermined amount.

8. A wireless communication device, comprising:

means for storing data indicative of a condition for selecting frequencies;

wherein the storing means maintains the data indicative of the condition both when the communication means performs communication and when the communication means stops performing communication, wherein the storing means includes an initial state memory storing data of a predetermined initial condition for selecting frequencies; and an operational state memory storing data of a changed condition for selecting frequencies;

means for performing communication with a carrier wave while successively selecting frequencies of the carrier wave according to the condition, data indicative of which is being stored in the storing means;

means for measuring a reception state of communication at each of the successively-selected frequencies; and means for changing the data indicative of the condition stored in the storing means according to the measured reception state.

9. A wireless communication device as claimed in claim 8, wherein the data indicative of the condition is constructed from data of the reception state measured by the measuring means for each frequency.

10. A wireless communication device as claimed in claim 8, wherein the data indicative of the condition is constructed from attribute data indicative of whether or not each frequency can be selected, the attribute data being determined dependent on the reception state measured by the measuring means.

11. A wireless communication device as claimed in claim 8, wherein the storing means includes a non-volatile memory.

12. A wireless communication device as claimed in claim 8, further comprising a power supply for supplying power to the device, wherein the storing means includes:

a volatile memory; and a back up power supply for supplying power to the volatile memory with regardless of whether the power supply stops supplying power to the device.

13. A wireless communication device as claimed in claim 8, wherein the data of the changed condition in the operational state memory is constructed from data indicative of the measured reception state.

14. A wireless communication device as claimed in claim 8, wherein the data of the changed condition in the operational state memory is constructed from attribute data indicative of whether or not each frequency can be selected, the attribute data being determined dependent on the reception state measured by the measuring means.

15. A wireless communication device as claimed in claim 14, wherein the initial state memory stores therein data indicative of a predetermined plurality of frequencies.

16. A wireless communication device as claimed in claim 15, wherein the communication means successively selects frequencies from the plurality of frequencies while referring to the operational state memory.

17. A wireless communication device as claimed in claim 8, wherein the communication means includes means for selecting either one of the initial condition stored in the initial state memory and the changed condition stored in the operational state memory to select frequencies at the initial stage of each communication.

18. A wireless communication device as claimed in claim 4, wherein the test control means further includes:

transmission control means for controlling the communication means to transmit, according to each frequency candidate, the digital test data and the check sum data to a remote communication device; and reception control means for controlling the communication means to receive, according to the frequency candidate, the digital test data and the check sum data transmitted back from the remote communication device.

* * * * *